US012374804B2

(12) United States Patent
Liu et al.

(10) Patent No.: US 12,374,804 B2
(45) Date of Patent: Jul. 29, 2025

(54) LENS, ELECTROMAGNETIC LENS ASSEMBLY HAVING THE LENS, AND WIRELESS COMMUNICATION DEVICE HAVING THE ELECTROMAGNETIC LENS ASSEMBLY

(71) Applicant: ACCTON TECHNOLOGY CORPORATION, Hsinchu (TW)

(72) Inventors: I-Ru Liu, Hsinchu (TW); Kai-Jia Yeh, Hsinchu (TW); Ming-Hung Su, Hsinchu (TW); Chih-Yung Chen, Hsinchu (TW); Wen-Pin Lo, Hsinchu (TW); Pai-Yuan Hsiao, Hsinchu (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 453 days.

(21) Appl. No.: 17/970,251

(22) Filed: Oct. 20, 2022

(65) Prior Publication Data

US 2023/0187842 A1 Jun. 15, 2023

(30) Foreign Application Priority Data

Dec. 13, 2021 (CN) ......................... 202123113330.6

(51) Int. Cl.

| | |
|---|---|
| ***H01Q 15/08*** | (2006.01) |
| ***H01Q 1/22*** | (2006.01) |
| ***H01Q 1/42*** | (2006.01) |
| ***H01Q 15/02*** | (2006.01) |
| ***H01Q 19/06*** | (2006.01) |
| *H04W 88/08* | (2009.01) |

(52) U.S. Cl.

CPC ........... *H01Q 19/06* (2013.01); *H01Q 1/2291* (2013.01); *H01Q 1/42* (2013.01); *H01Q 15/02* (2013.01); *H04W 88/08* (2013.01)

(58) Field of Classification Search

CPC .......... H01Q 1/22; H01Q 1/2291; H01Q 1/42; H01Q 15/02; H01Q 15/08; H01Q 19/06; H01Q 21/06; H01Q 21/061

See application file for complete search history.

(56) References Cited

U.S. PATENT DOCUMENTS 3,317,911 A * 5/1967 Stahler .................... G02B 3/08 343/837

3,434,138 A * 3/1969 Shostak ................ H01Q 13/02 343/754

(Continued)

*Primary Examiner* — Tho G Phan

(74) *Attorney, Agent, or Firm* — Birch, Stewart, Kolasch & Birch, LLP

(57) ABSTRACT

A wireless communication device includes a casing having a wireless signal penetrating area, an antenna sending a wireless signal through the wireless signal penetrating area, and an electromagnetic lens assembly including a lens barrel and a lens. The lens barrel has a first end and a second end. The first end is closer to the wireless signal penetrating area than the second end. The lens disposed in the lens barrel has an incident surface and an emission surface on an axis of the lens. The incident surface is a flat surface facing the first end. The emission surface is a convex surface and has a curvature, which is not equal to 0, from a perspective of a first axis perpendicular to the axis of the lens, and has a curvature of 0 from a perspective of a second axis perpendicular to the axis of the lens and the first axis.

15 Claims, 27 Drawing Sheets

(56) References Cited

U.S. PATENT DOCUMENTS

| | | | | |
|---|---|---|---|---|
| 4,148,040 | A * | 4/1979 | Lunden | H01Q 1/28<br>343/753 |
| 6,590,544 | B1 * | 7/2003 | Filipovic | H01Q 19/062<br>343/753 |
| 8,730,114 | B2 * | 5/2014 | Elliot | H01Q 3/24<br>343/754 |
| 11,158,954 | B2 * | 10/2021 | Bieti | H01Q 1/288 |

* cited by examiner

H1
H
50
48
46
i
R1
R
44
H2
X
Z

Z-X plane
Angle (deg)

Gain(dBi)

Z-Y plane
Angle (deg)

Gain(dBi)

Z-X plane
Angle (deg)

Gain(dBi)

Z-Y plane
Angle (deg)

Gain(dBi)

Z-X plane
Angle (deg)

Gain(dBi)

Z-Y plane
Angle (deg)

Gain(dBi)

LENS, ELECTROMAGNETIC LENS ASSEMBLY HAVING THE LENS, AND WIRELESS COMMUNICATION DEVICE HAVING THE ELECTROMAGNETIC LENS ASSEMBLY

BACKGROUND OF THE INVENTION

Technical Field

The present disclosure relates generally to a wireless communication, and more particularly to a lens, an electromagnetic lens assembly having the lens, and a wireless communication device having the electromagnetic lens assembly.

Description of Related Art

With advantages in wireless communication, the demand for wireless signal bandwidth and data transmission rate is increasing day by day, and therefore, there is a need for the manufacturers to develop an antenna module with high peak gain and high wireless transmission rates.

Typically, conventional wireless signal accesses points are used for the transmission of wireless signals on a wireless network, and the coverage of the wireless signals sent by the wireless signal accesses points are usually relatively wide. However, in certain cases, the wireless signal needs to be concentrated in a specific direction, so that the general accesses point is not applicable. In such cases, a wireless signal accesses point with an electromagnetic lens is needed to concentrate the wireless signals in a specific direction.

The conventional wireless signal accesses point with an electromagnetic lens usually embeds the electromagnetic lens in a casing of the wireless signal accesses point, and the structure of the casing is different from the casing of a general wireless signal accesses point. The manufacturers of the wireless signal accesses point have to prepare two types of casing s at the same time to meet different requirements, one is for the general wireless signal accesses point, and the other is for the wireless signal accesses point with electromagnetic lens, which may cause unnecessary inventory pressure.

BRIEF SUMMARY OF THE INVENTION

In view of the above, the primary objective of the present disclosure is to provide a lens, an electromagnetic lens assembly having the lens, and a wireless communication device having the electromagnetic lens assembly, which could bring down inventory and stocking cost of the casing for manufacturers.

The present disclosure provides a wireless communication device, including a casing, an antenna, and an electromagnetic lens assembly, wherein the casing has a wireless signal penetrating area. The antenna is located in the casing and corresponds to the wireless signal penetrating area and sends a wireless signal through the wireless signal penetrating area. The electromagnetic lens assembly includes a lens barrel and a lens, wherein the lens barrel has a first end and a second end opposite to the first end on an axis of the lens barrel. The first end is closer to the wireless signal penetrating area than the second end. The lens is disposed in the lens barrel for concentrating an electromagnetic wave. The lens has an incident surface and an emission surface on an axis of the lens, wherein the incident surface of the lens is a flat surface and faces the first end, and the emission surface is a convex surface. The emission surface has a curvature, which is not equal to 0, from a perspective of a first axis perpendicular to the axis of the lens, and has a curvature of 0 from a perspective of a second axis perpendicular to the axis of the lens and the first axis. The lens satisfies $0.50 \leq R/Rc \leq 0.6$ and $0.4 \leq R/D \leq 0.5$, wherein a radius of a projection circle that the emission surface projects along the axis of the lens is defined as R; a curvature radius of the emission surface on the second axis is defined as Rc; a distance between the incident surface and the antenna on the axis of the lens is defined as D.

The present disclosure further provides an electromagnetic lens assembly, including a lens barrel and a lens disposed in the lens barrel for concentrating an electromagnetic wave, wherein the lens barrel has a first end and a second end opposite to the first end on an axial direction of the lens barrel. The lens has an incident surface and an emission surface on an axis of the lens, wherein the incident surface is a flat surface facing the first end; the emission surface is a convex surface, and has a curvature, which is not equal to 0, from a perspective of a first axis perpendicular to the axis of the lens, and has a curvature of 0 from a perspective of a second axis perpendicular to the axis of the lens and the first axis. The lens satisfies $0.50 \leq R/Rc \leq 0.6$, wherein a radius of a projection circle that the emission surface projects along the axis of the lens is defined as R; a curvature radius of the emission surface on the second axis is defined as Rc.

The present disclosure further provides a lens for concentrating an electromagnetic wave, wherein the lens has an incident surface and an emission surface on an axis of the lens. The emission surface is a convex surface, and has a curvature, which is not equal to 0, from a perspective of a first axis perpendicular to the axis of the lens, and has a curvature of 0 from a perspective of a second axis perpendicular to the axis of the lens and the first axis. The incident surface is a flat surface. The lens satisfies $0.50 \leq R/Rc \leq 0.6$, wherein a radius of a projection circle that the emission surface projects along the axis of the lens is defined as R; a curvature radius of the emission surface on the second axis is defined as Rc.

With the aforementioned design, the electromagnetic lens assembly could facilitate directional gain on the wireless signals emitted by the antenna, without increasing the thickness of the casing of the host. When the electromagnetic lens assembly is removed, the host could transmit wireless signals without the electromagnetic lens assembly, which effectively brings down inventory and stocking cost of the casing for manufacturers.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
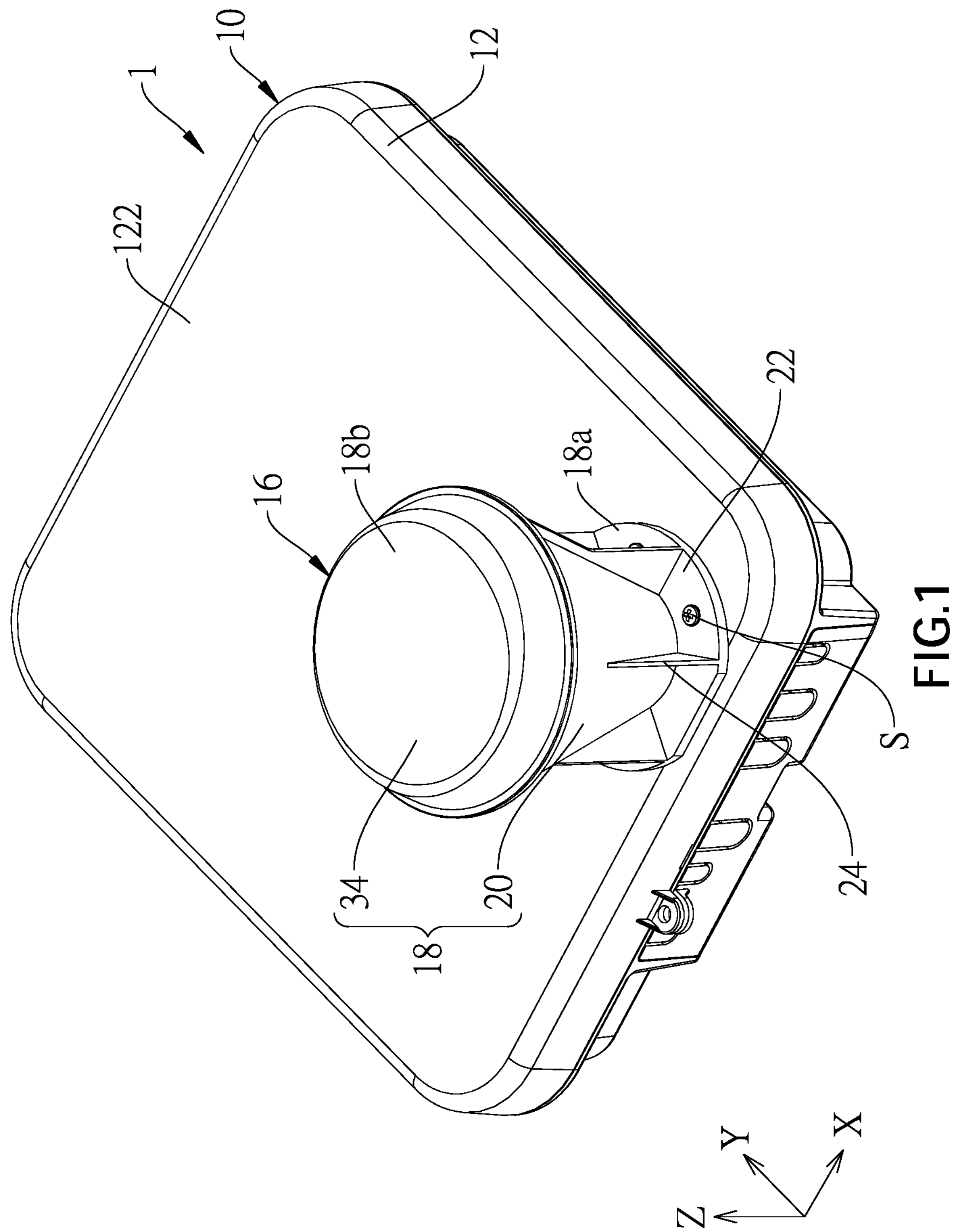
FIG. 1 is a perspective view of the wireless communication device according to a first embodiment of the present disclosure.
Figure 2:
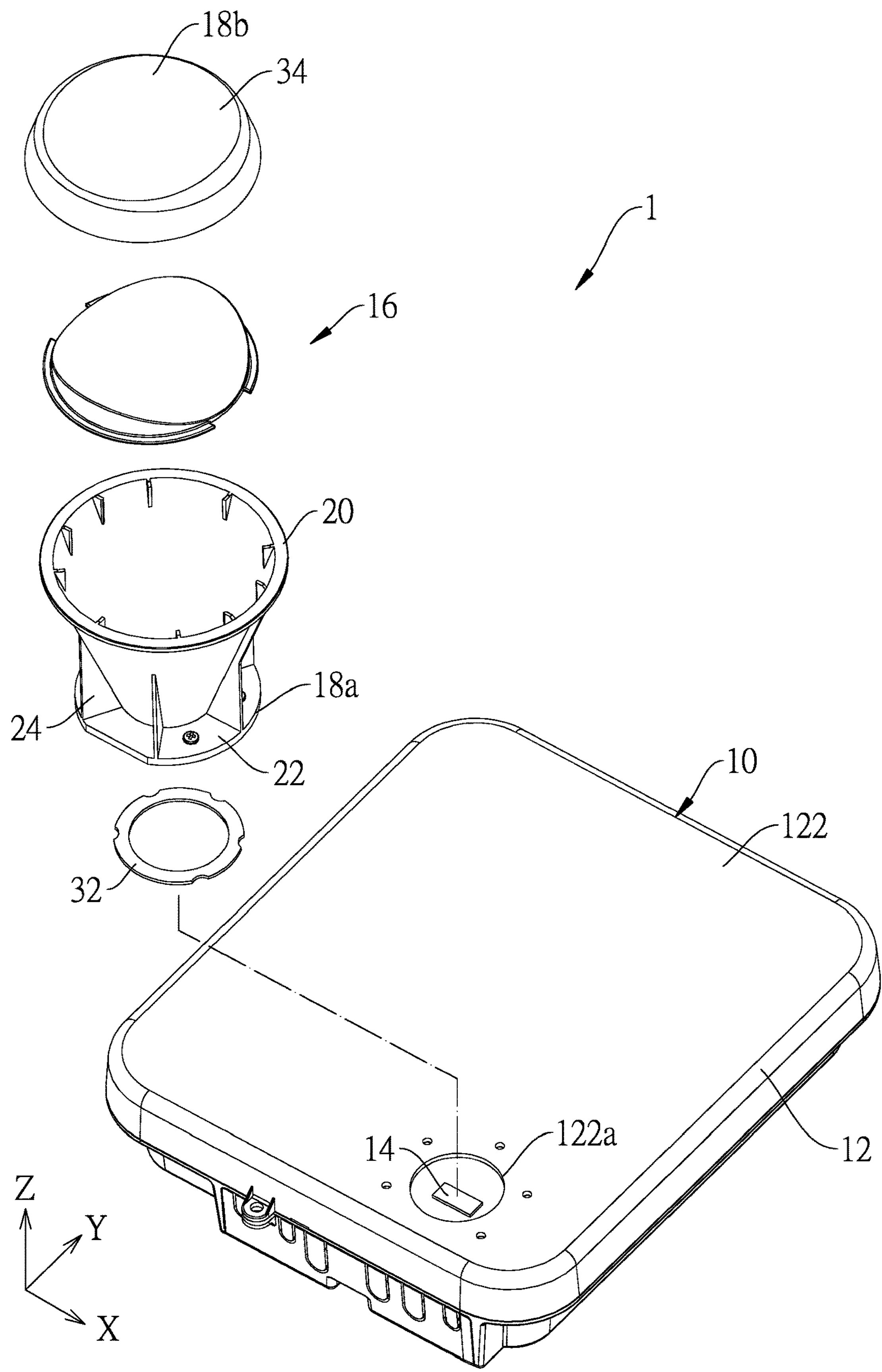
FIG. 2 is a partially exploded view of the wireless communication device according to the first embodiment of the present disclosure.
Figure 3:
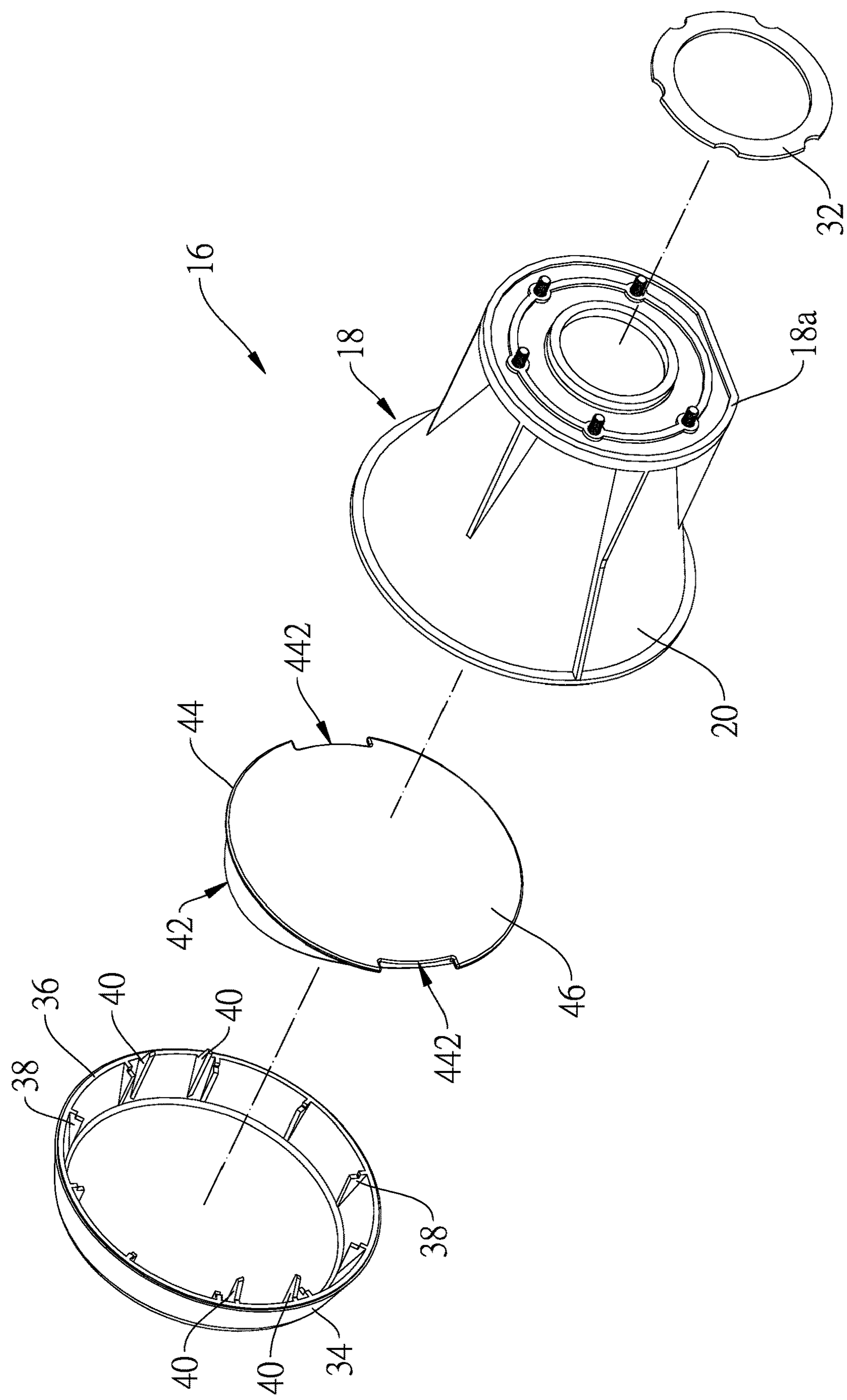
FIG. 3 is an exploded view of the electromagnetic lens assembly according to the first embodiment of the present disclosure.
Figure 4:
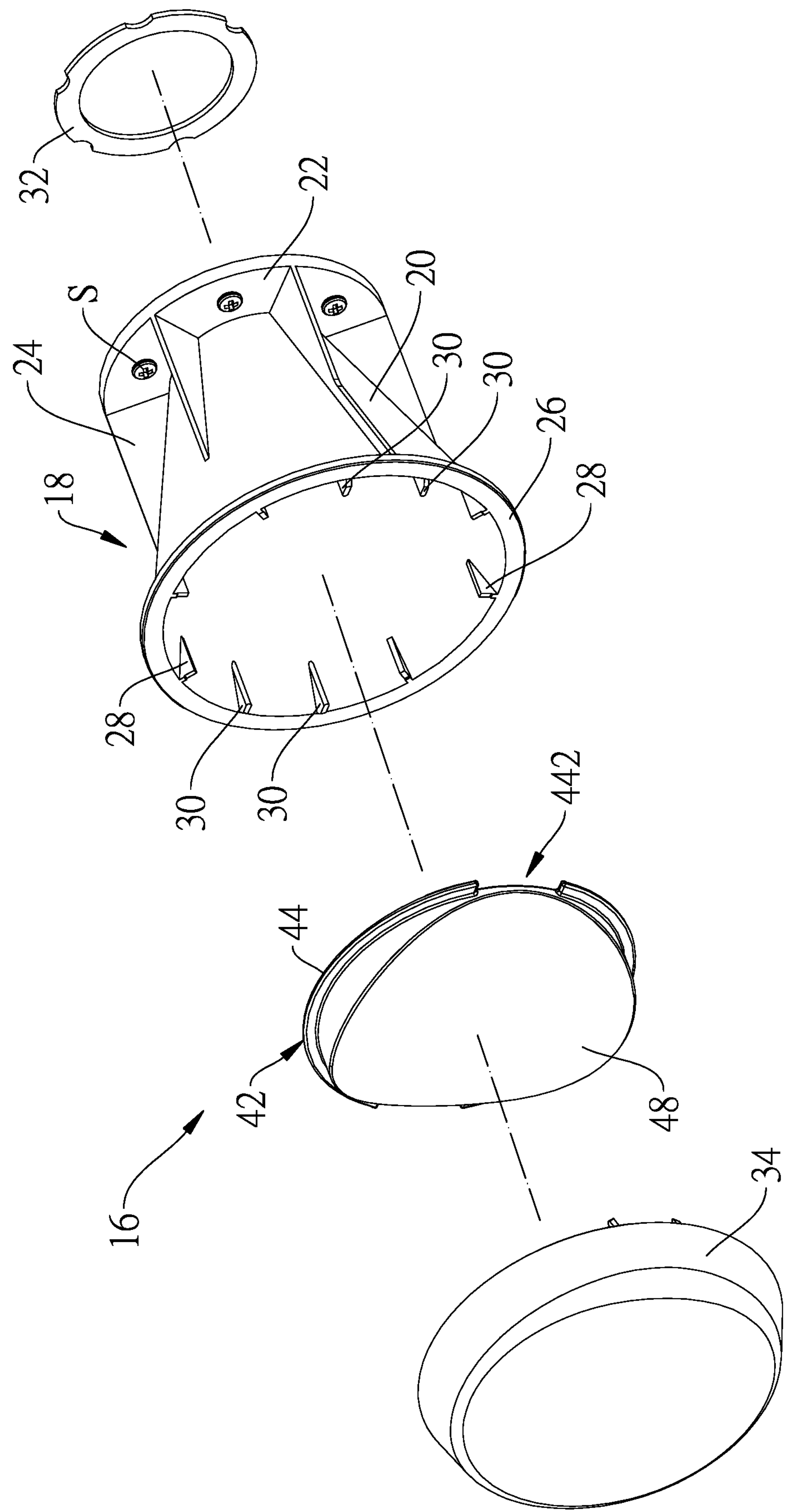
FIG. 4 is an exploded view of the electromagnetic lens assembly according to the first embodiment of the present disclosure seen from another direction.
Figure 5:
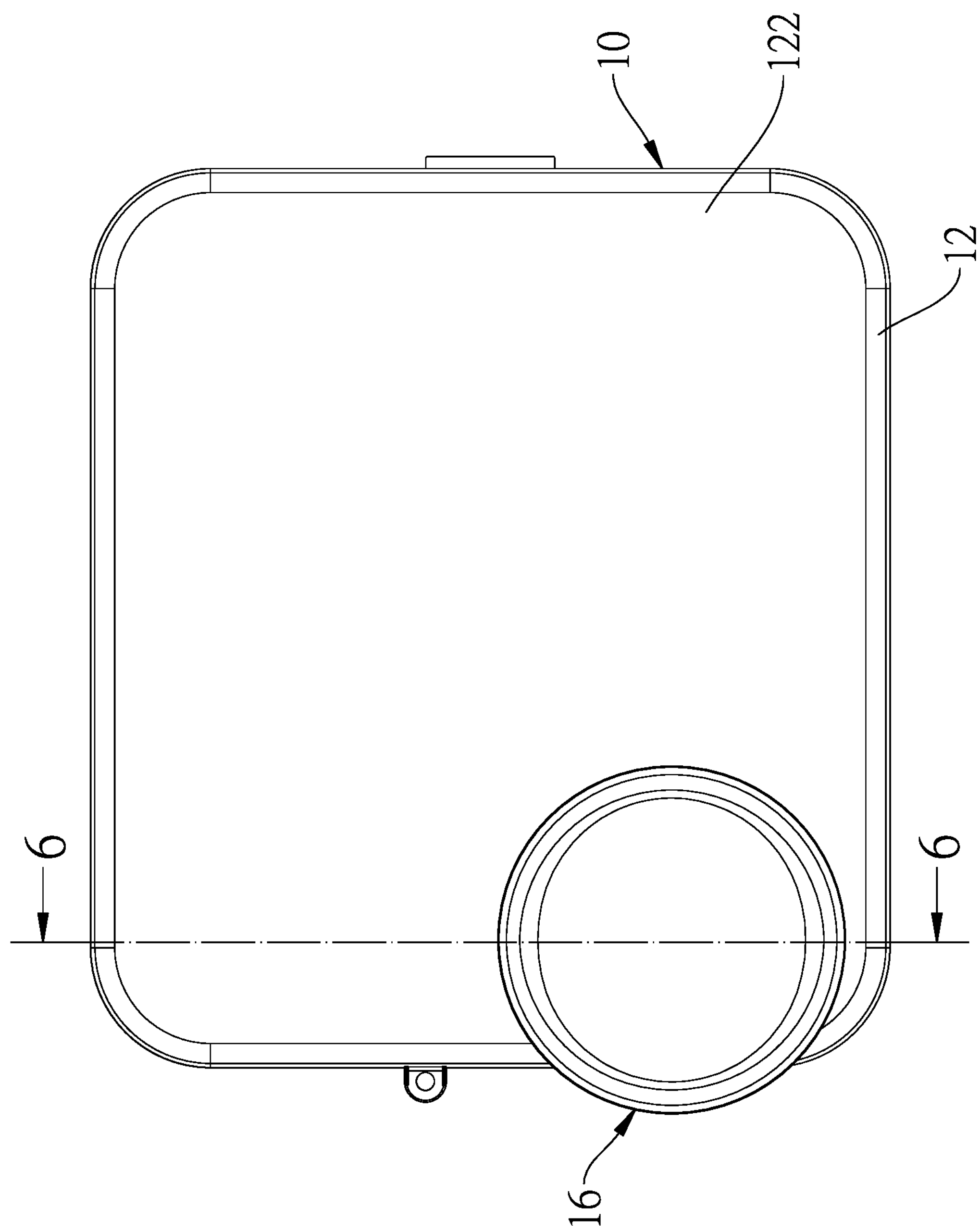
FIG. 5 is a top view of the wireless communication device according to the first embodiment of the present disclosure.

A wireless communication device 1 according to a first embodiment of the present disclosure is illustrated in FIG. 1 to FIG. 12, wherein the wireless communication device 1 is an accesses point as an example. The wireless communication device 1 includes a host 10 and an electromagnetic lens assembly 16. A first axis X, a second axis Y, and a third axis Z that are perpendicular to one another are defined for explanation purpose.

The host 10 is adapted to send and receive wireless signals such as Wi-Fi signals, wherein the host 10 includes a casing 12 and an antenna 14. The casing 12 is made of plastic, such as Acrylonitrile Butadiene Styrene (ABS), Polycarbonate (PC), etc. A side plate 122 of the casing 12 has an opening 122*a* that constitutes a wireless signal penetrating area. The antenna 14 is located in the casing 12 and corresponds to the opening 122*a*. In the current embodiment, the antenna 14 is an array antenna that is a 3×5 array antenna as an example. However, the antenna 14 could be a 2×4, 4×8, 4×4, 8×8, or higher-order array antennas in other embodiments. A center of the antenna 14 and a center of the opening 122*a* are located at the same axis (i.e., the third axis Z), and a longitudinal direction of the antenna 14 extends along the first axis X, while a latitudinal direction of the antenna 14 extends along the second axis Y, wherein the antenna 14 sends a wireless signal via the opening 122*a*.

The electromagnetic lens assembly 16 is detachably engaged with the casing 12 and corresponds to the opening 122*a* and includes a lens barrel 18 and a lens 42, wherein an axial direction of the lens barrel 18 extends along the third axis Z, and the lens barrel 18 has a first end 18*a* and a second end 18*b* opposite to the first end 18*a* in the axial direction of the lens barrel 18. The first end 18*a* is closer to the opening 122*a* than the second end 18*b*. The lens 42 is disposed in the lens barrel 18 for concentrating an electromagnetic wave of the wireless signal sent by the antenna 14. The lens 42 is made of a material that could be passed through by the electromagnetic wave. In the embodiment, the material can be a high-frequency microwave plastic (Rexolite1422), which has a dielectric constant of 2.53, a refractive index of 1.59, a dissipation factor of 0.00066 in 10 GHz, or other materials with low loss tangent such as teflon.

In the current embodiment, the lens barrel 18 includes a tube body 20 and a protective cover 34, wherein the tube body 20 and the protective cover 34 are made of plastic, such as Acrylonitrile Butadiene Styrene (ABS), Polycarbonate (PC), etc., for preventing UV penetration. The tube body 20 is tapered in shape, wherein two ends of the tube body 20 are open, and one of the two ends of the tube body 20 is the first end 18*a*. The first end 18*a* has an engaging portion 22, wherein the engaging portion 22 is detachably engaged with a periphery around the opening 122*a* via a plurality of bolts S. An outer periphery of the tube body 20 has a plurality of strengthening ribs 24. The electromagnetic lens assembly 16 could selectively include a sealing ring 32 disposed between the engaging portion 22 and the side plate 122 of the casing 12, thereby sealing the periphery around the engaging portion 22 and the opening 122*a*. The other end of the tube body 20 is a first engaging end 26 adapted to be engaged with the protective cover 34. A side of the protective cover 34 is a second engaging end 36, wherein the second engaging end is open, while another side of the protective cover 34 is the second end 18*b* and is closed.

Referring to FIG. 3 to FIG. 12, an inner wall of the tube body 20 adjacent to the first engaging end 26 has a plurality of supporting ribs 28 and a plurality of first positioning ribs 30, wherein the supporting ribs 28 and the first positioning ribs 30 are arranged radially. In the current embodiment, a number of the first positioning ribs 30 is four as an example, wherein the first positioning ribs 30 slightly protrude out of the first engaging end 26. The supporting ribs 28 constitute a shoulder portion of the tube body 20. An inner wall of the protective cover 34 has a plurality of abutting ribs 38 and a plurality of second positioning ribs 40, wherein the abutting ribs 38 are arranged radially and constitute an abutting portion. In the current embodiment, a number of the second positioning ribs 40 is four as an example, and the second positioning ribs 40 slightly protrude out of the second engaging end 36.

Figure 6:
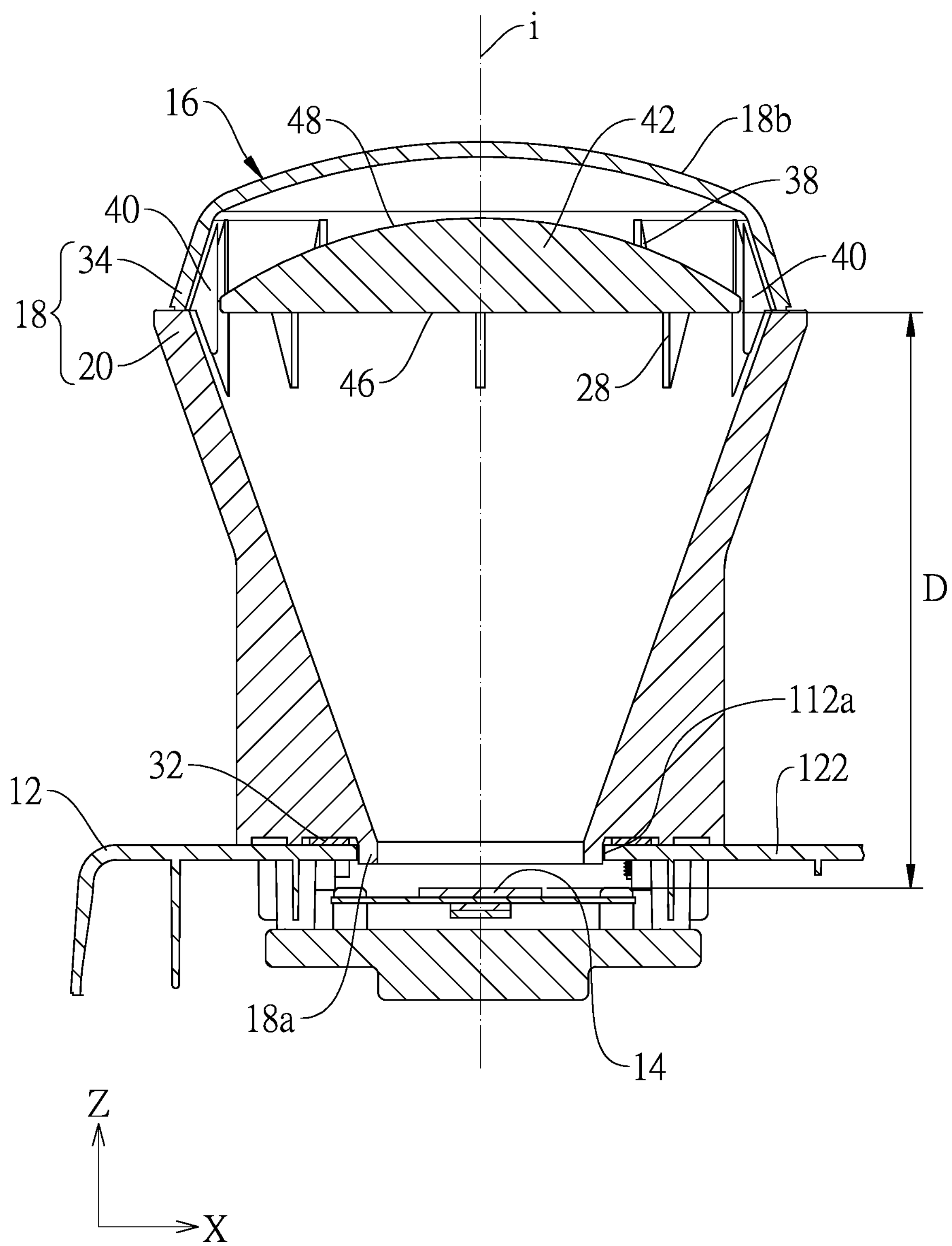
FIG. 6 is a sectional view along the 6-6 line in FIG. 5.
Figure 7:
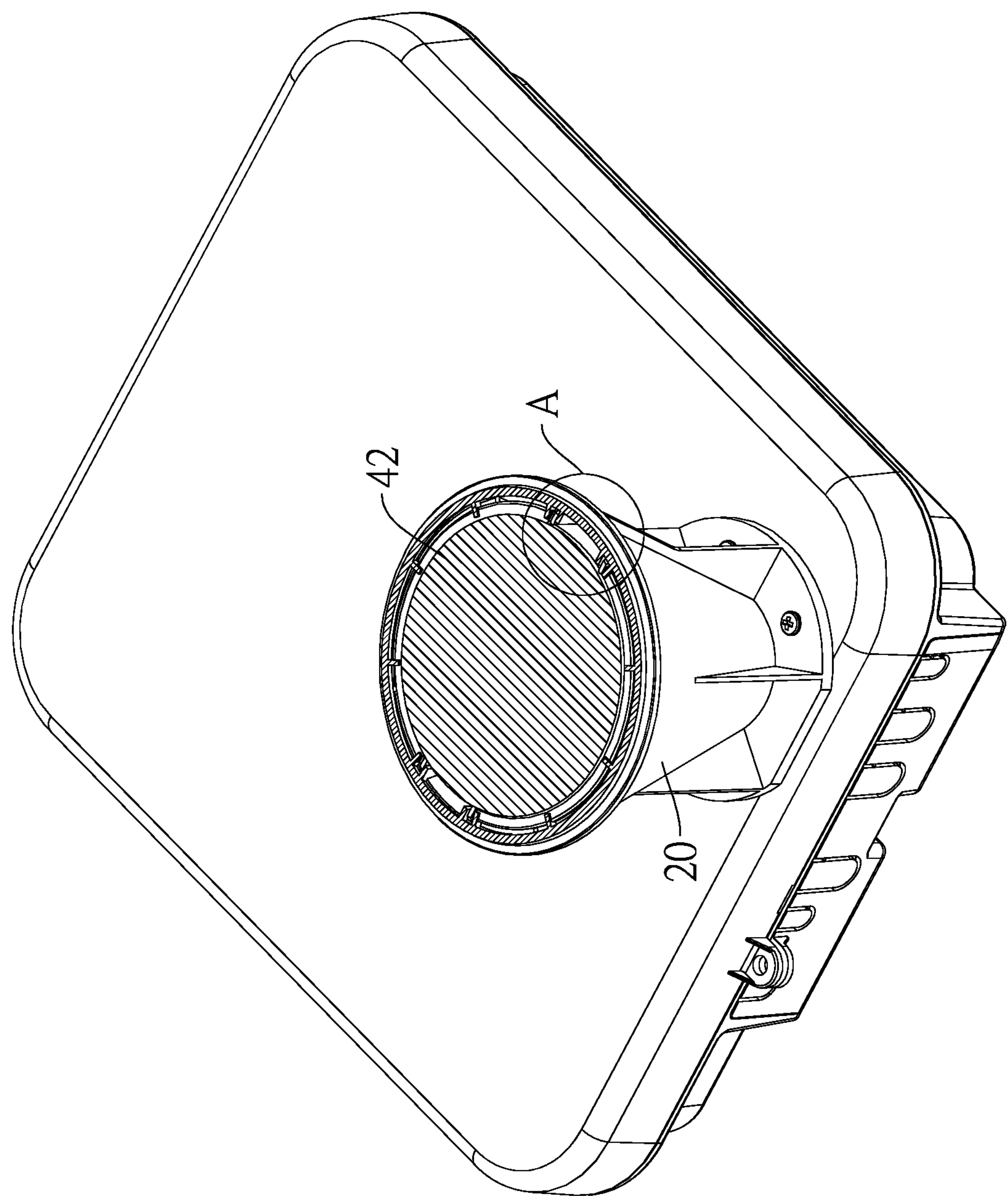
FIG. 7 is a schematic view, showing partially sectional view of the wireless communication device according to the first embodiment of the present disclosure.
Figure 8:
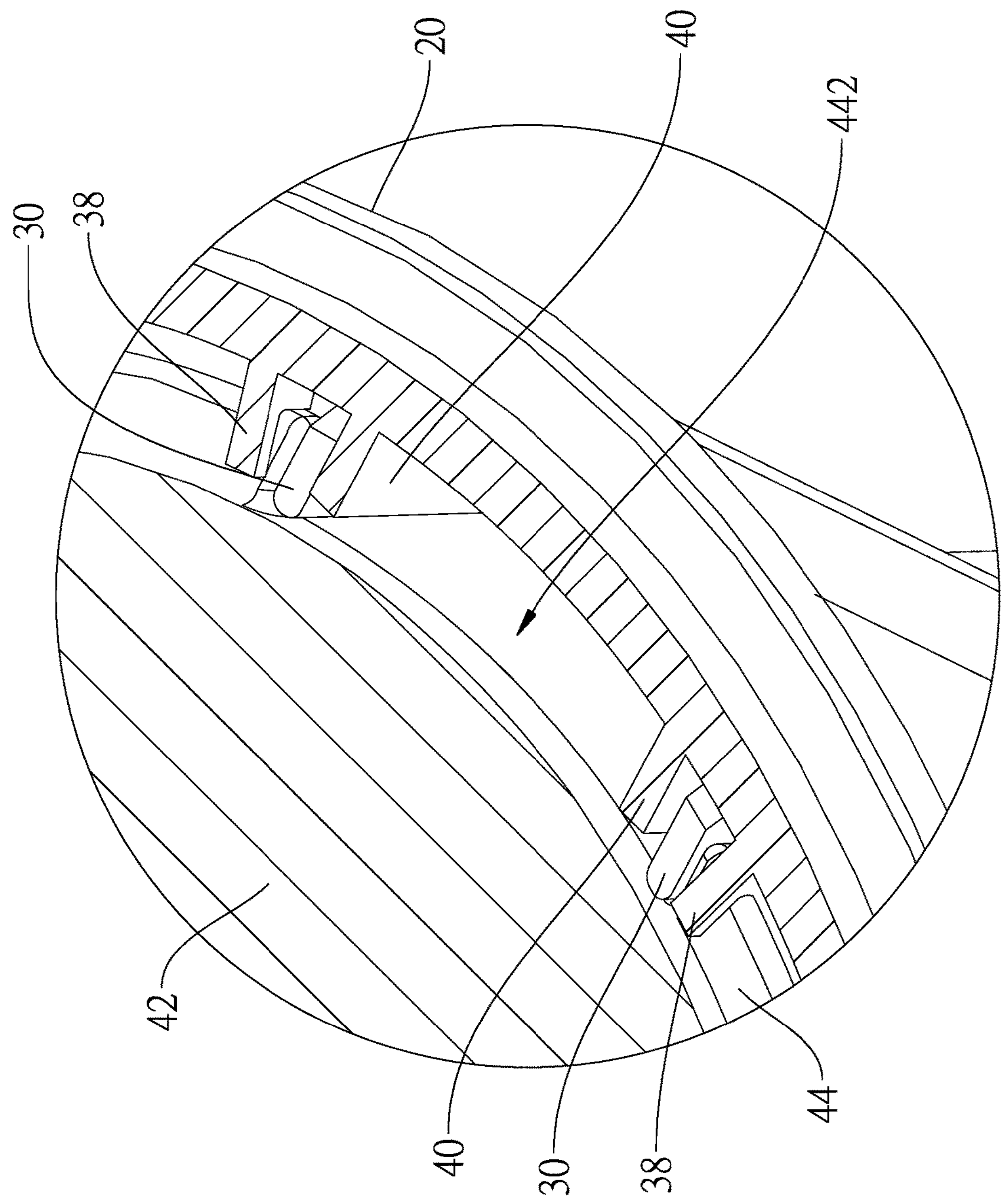
FIG. 8 is an enlarged partial view of a marked region A in FIG. 7.
Figure 9:
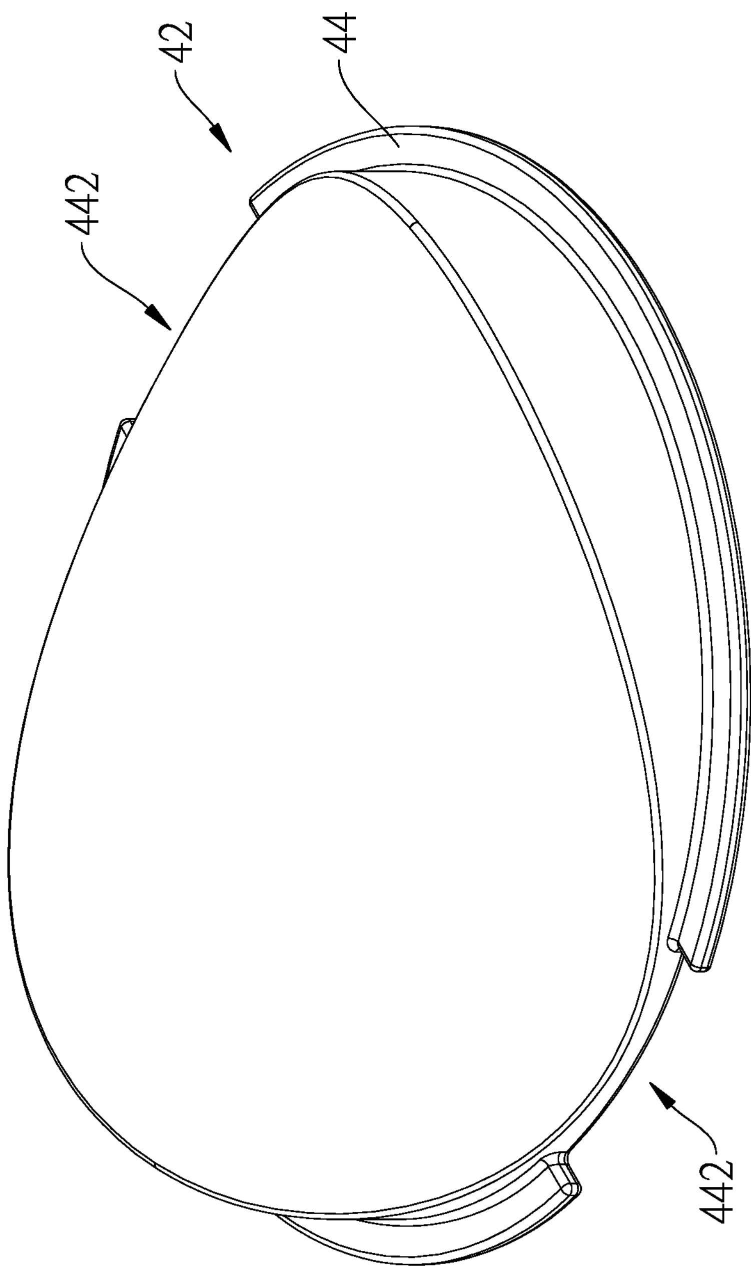
FIG. 9 is a perspective view of the lens of according to the first embodiment of the present disclosure.
Figure 10:
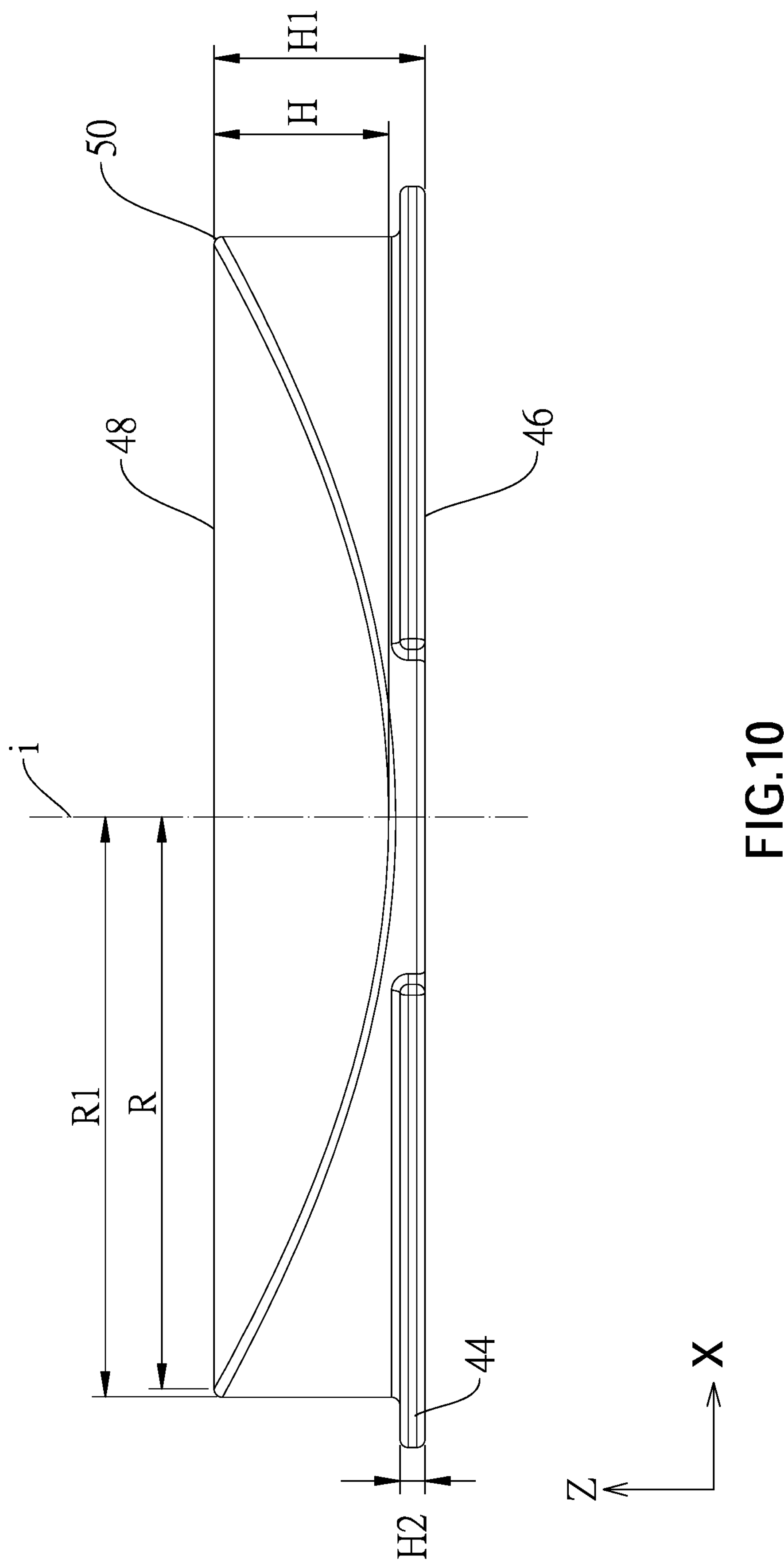
FIG. 10 is a front view of the lens of according to the first embodiment of the present disclosure.

The lens 42 is a cylinder and has a flange portion 44 protruding in a radial direction of the lens 42. Referring to FIG. 6 to FIG. 8, a side of the flange portion 44 in an axial direction of the lens 42 (i.e., the third axis Z) abuts against the supporting ribs 28 of the tube body 20, and the abutting ribs 38 of the protective cover 34 abut against another side of the flange portion 44 in the axial direction of the lens 42, thereby fixing the lens 42. The flange portion 44 has a plurality of notches 442. In the current embodiment, each of two sides of the lens 42 in the radial direction of the lens 42 has a notch 442 as an example, wherein two of the first positioning ribs 30 enters one of the notches 442, and the two first positioning ribs 30 respectively abut against two sides of the notches 442 in a circumference of the lens 42, thereby restricting the lens 42 from rotating. Two of the second positioning ribs 40 of the protective cover 34 correspondingly enter between the two first positioning ribs 30 and respectively abut against the corresponding two first positioning ribs 30, thereby restricting the protective cover 34 from rotating. The second engaging end 36 of the protective cover 34 could be engaged with the first engaging end 26 of the tube body 20 (e.g. via a glue).

Figure 11:
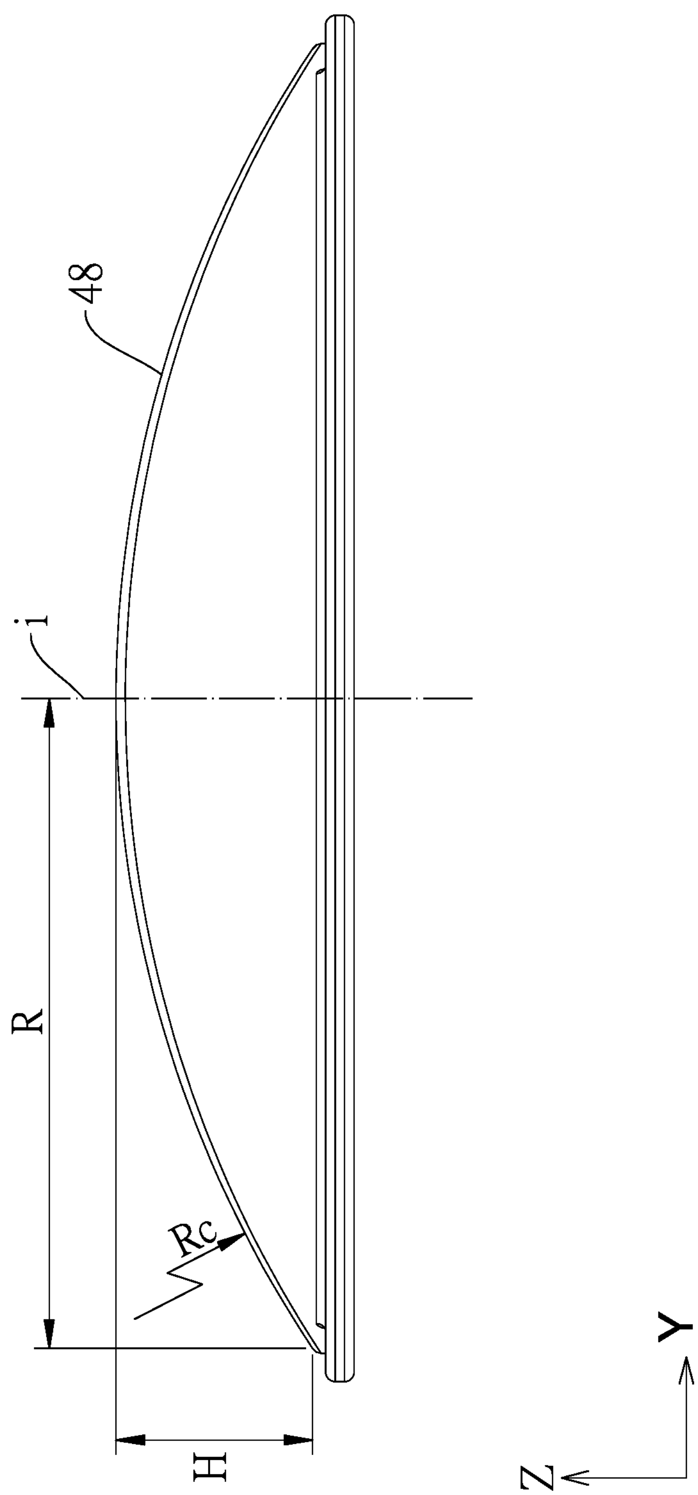
FIG. 11 is a side view of the lens of according to the first embodiment of the present disclosure.
Figure 12:
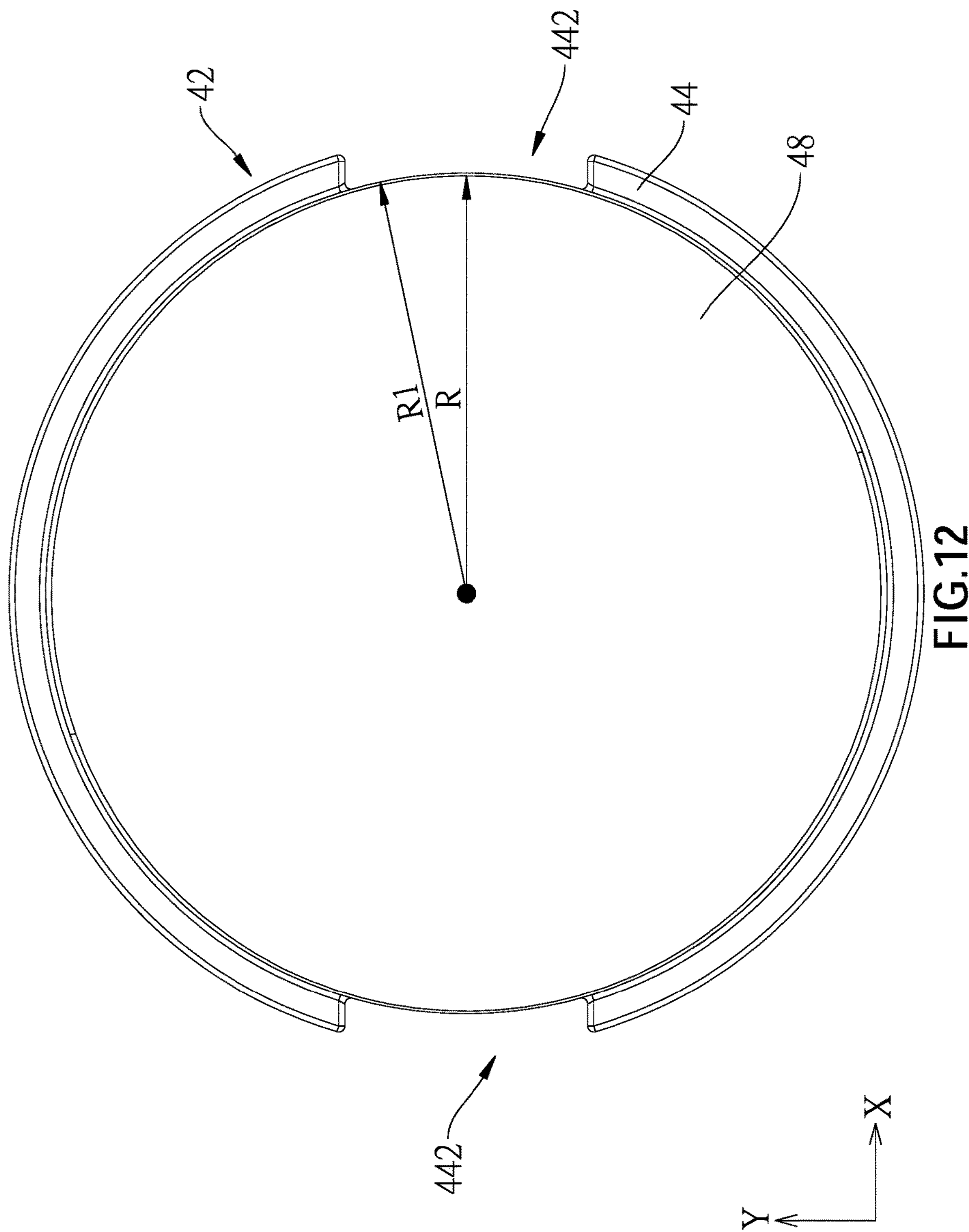
FIG. 12 is a top view of the lens of according to the first embodiment of the present disclosure.

Referring to FIG. 9 to FIG. 12, an axis i of the lens 42 extends along the third axis Z, wherein the lens 42 has an incident surface 46 and an emission surface 48 in the axis i. The incident surface 46 is a flat surface facing the first end 18*a* and is perpendicular to the axis i. The emission surface 48 is a convex surface and has a curvature from the perspective of the first axis X, wherein the curvature is not equal to 0. The emission surface 48 has a curvature of 0 from the perspective of the second axis Y. Referring to FIG. 12, a radius of a projection circle that the emission surface 48 projects along the axis i is defined as R. Referring to FIG. 11, a curvature radius of the emission surface 48 on the second axis Y is defined as Rc. Referring to FIG. 6, a distance between the incident surface 46 and the antenna 14 on the axis i is defined as D. The lens 42 satisfies $0.50 \le R/Rc \le 0.6$ and $0.4 \le R/D \le 0.5$.

When the lens 42 satisfies the abovementioned conditions, a wireless signal emitted through the emission surface 48 could have a good directivity gain.

In the current embodiment, a radius R1 of the cylinder of the lens 42 is 34.7 mm, and a periphery of the emission surface 48 has a round angle 50. The radius R of the projection circle of the emission surface 48 is 34.15 mm. The curvature radius Rc of the emission surface 48 is 62 mm. A height H between a lowest point and a highest point of the emission surface 48 on the axis i is about 10.4 mm, wherein $H = Rc - \sqrt{Rc^2 - R^2}$. A thickness H1 of the lens 42 on the axis i is 12.6 mm. A thickness H2 of the flange portion 44 on the axis i is 1.5 mm. The distance D between the incident surface 46 and the antenna 14 on the axis i is 76.7 mm. R/Rc is about 0.55. R/D is about 0.45. R/D is related to a coverage area of a wave beam of the antenna 14 (or a scanning angle of an array antenna), wherein $R/D = \tan(\alpha)$; 2 times a is the coverage area of the wave beam (or the scanning angle of the array antennas).

In an embodiment that a periphery of the emission surface 48 does not have the round angle 50, the radius R1 of the cylinder (e.g. 34.7 mm) is equal to a radius R of a projection circle of the emission surface 48 along the axis i, wherein at this time, a height H between the lowest point and the highest point of the emission surface 48 on the axis i is about 10.6 mm.

Figure 13:
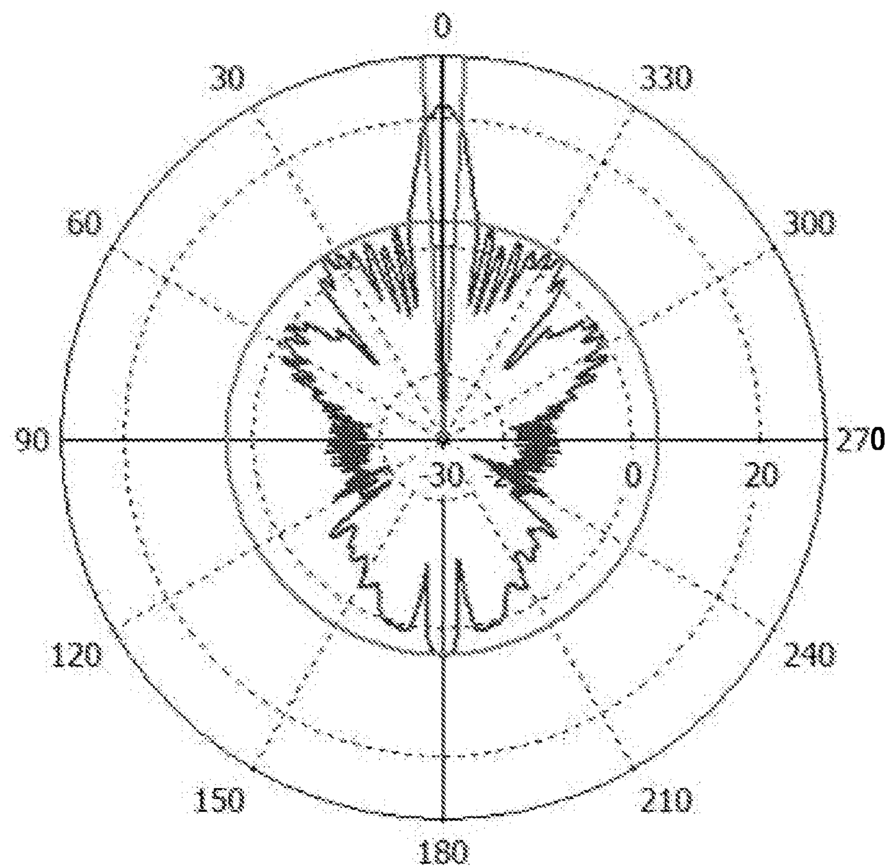
FIG. 13 is a schematic view, showing radiation pattern of the wireless communication device on the Z-X plane according to the first embodiment of the present disclosure.
Figure 14:
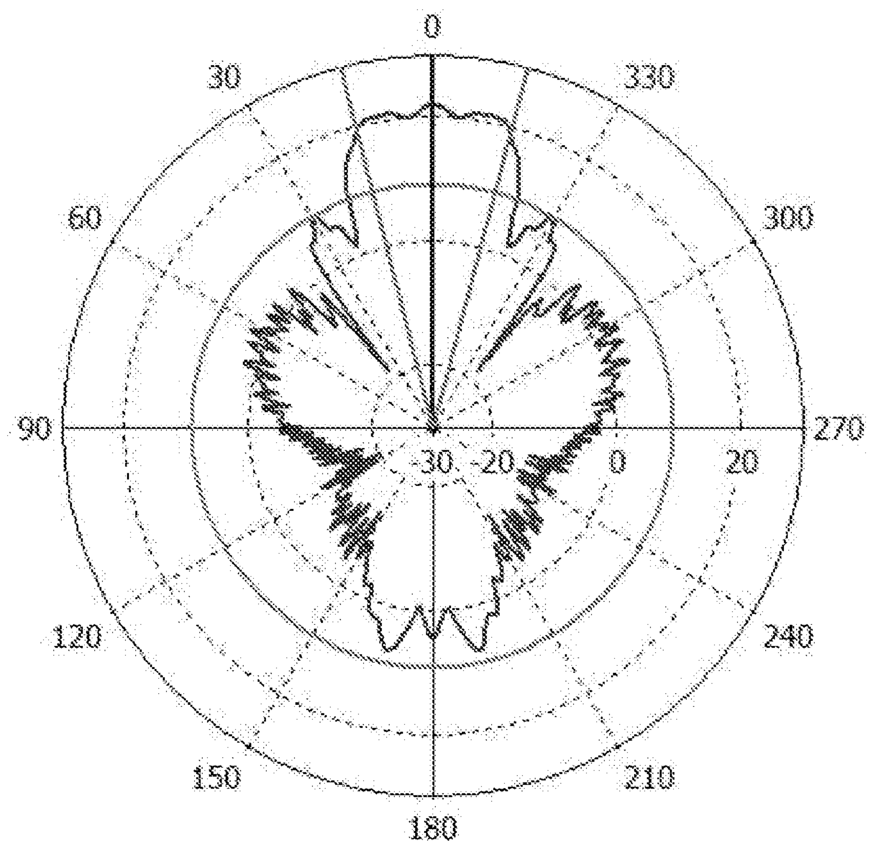
FIG. 14 is a schematic view, showing radiation pattern of the wireless communication device on the Z-Y plane according to the first embodiment of the present disclosure.
Figure 15:
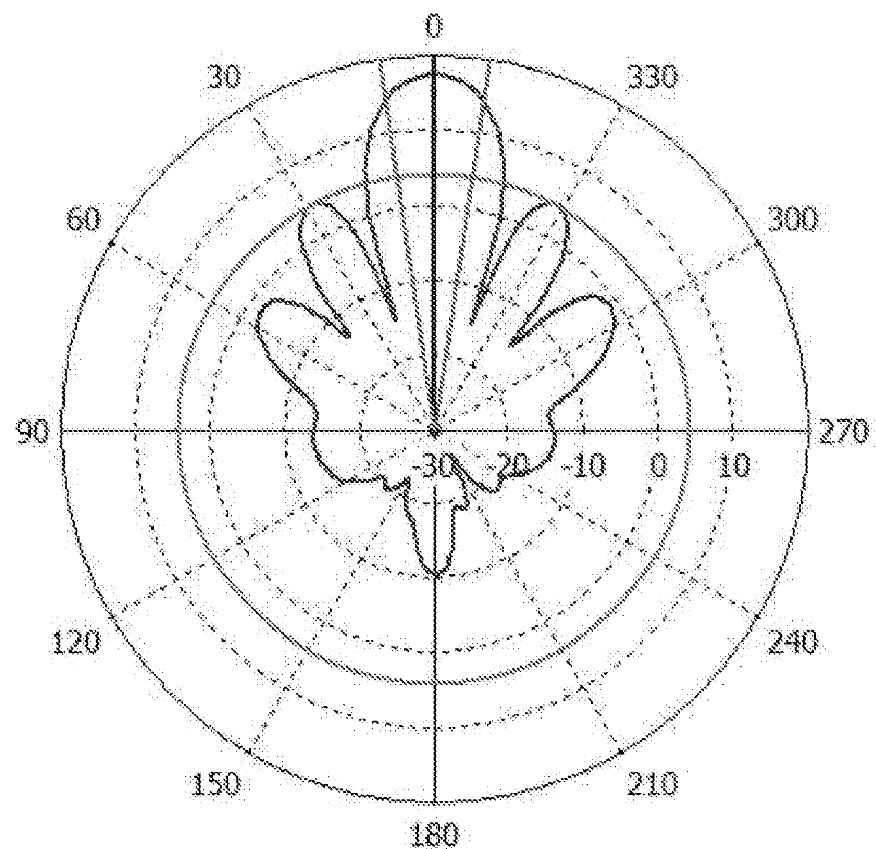
FIG. 15 is a schematic view, showing radiation pattern of the wireless communication device on the Z-X plane without disposing the electromagnetic lens assembly according to the first embodiment of the present disclosure.
Figure 16:
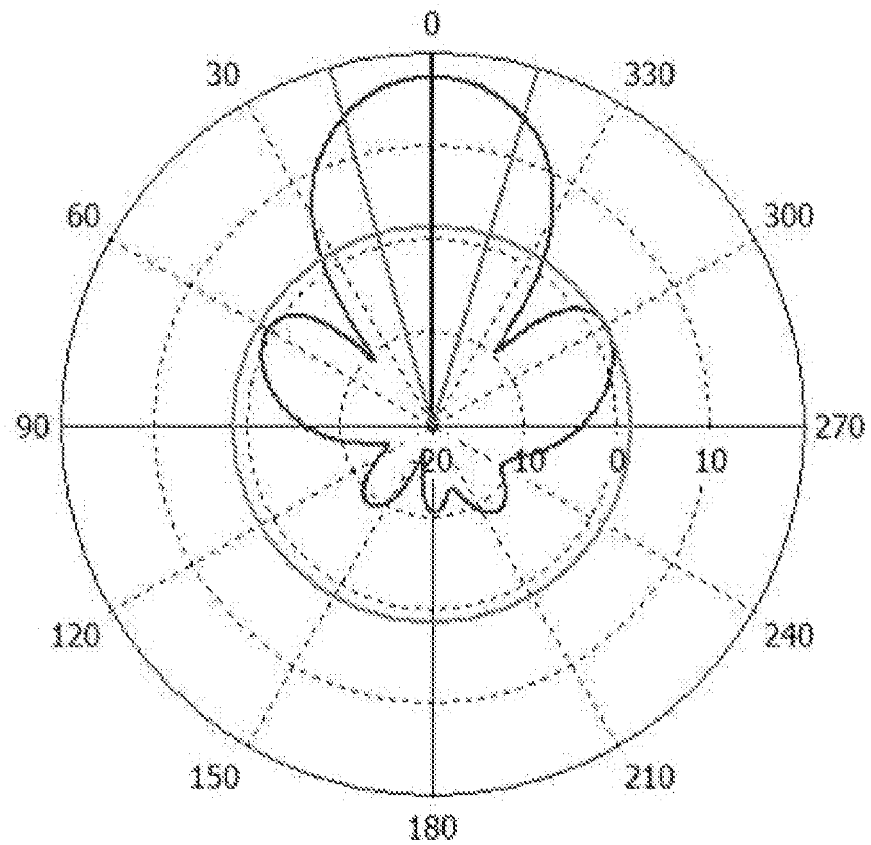
FIG. 16 is a schematic view, showing radiation pattern of the wireless communication device on the Z-Y plane without disposing the electromagnetic lens assembly according to the first embodiment of the present disclosure.
Figure 17:
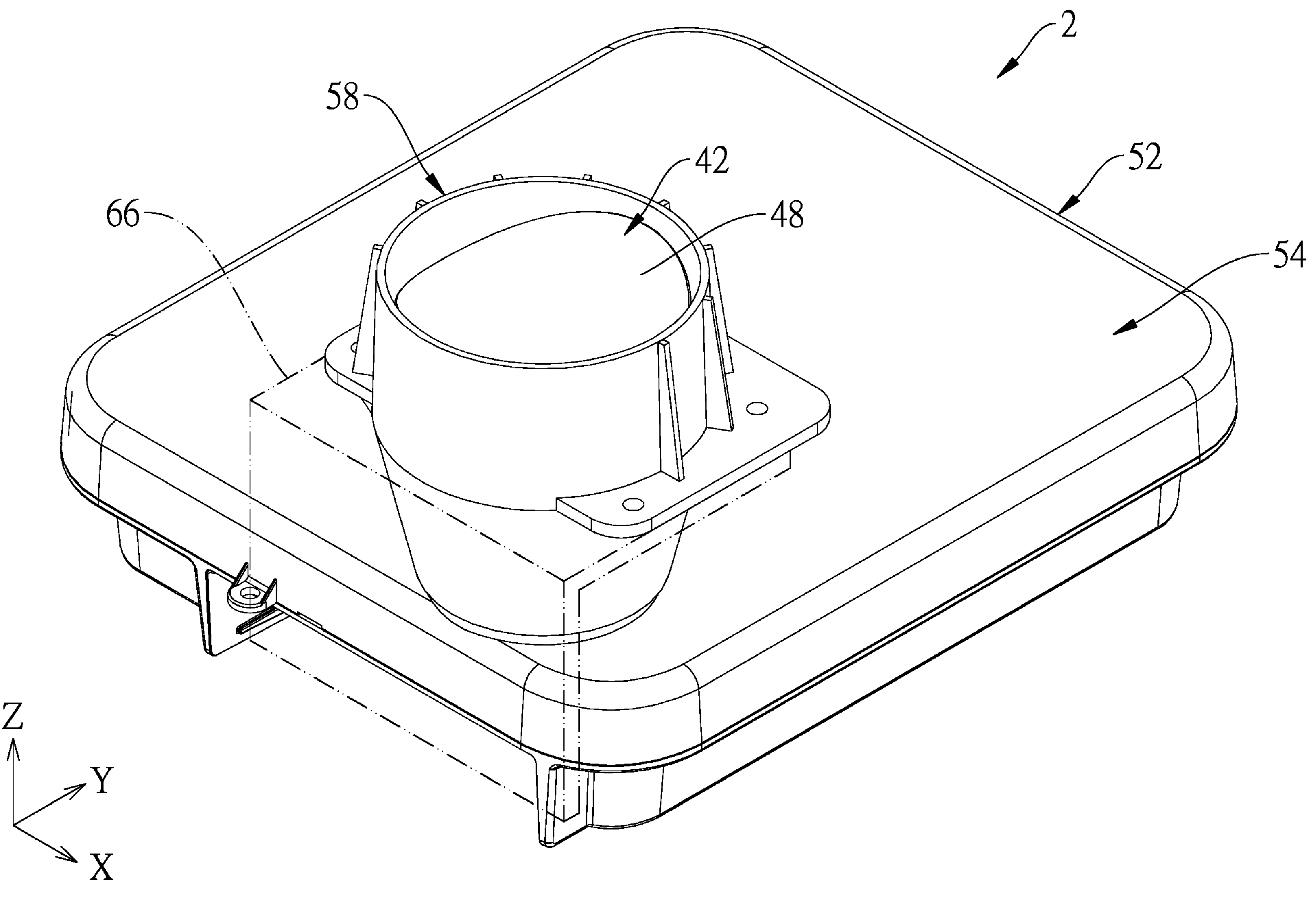
FIG. 17 is a perspective view of the wireless communication device according to a second embodiment of the present disclosure.
Figure 18:
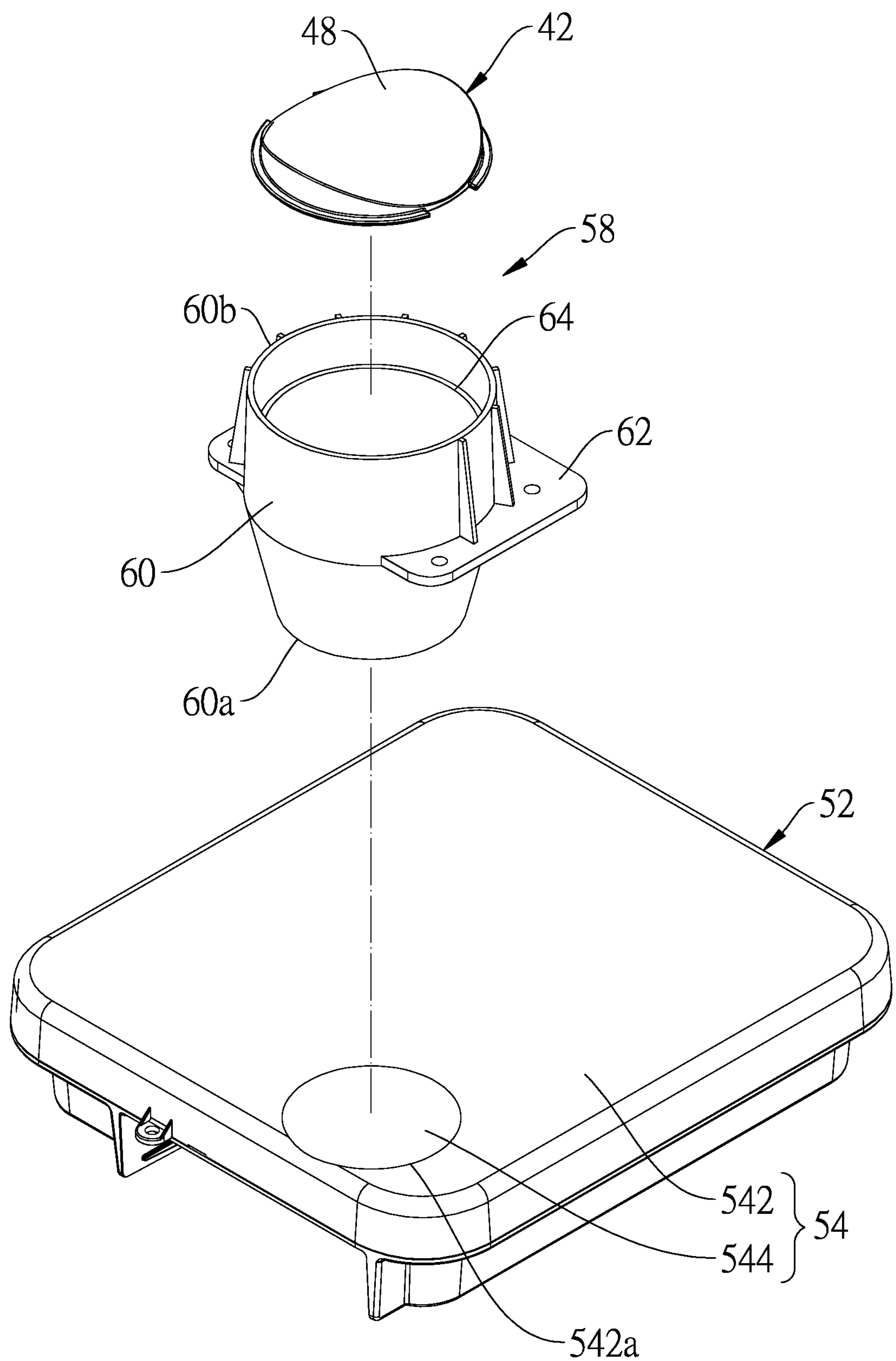
FIG. 18 is a partially exploded view of the wireless communication device according to the second embodiment of the present disclosure.
Figure 19:
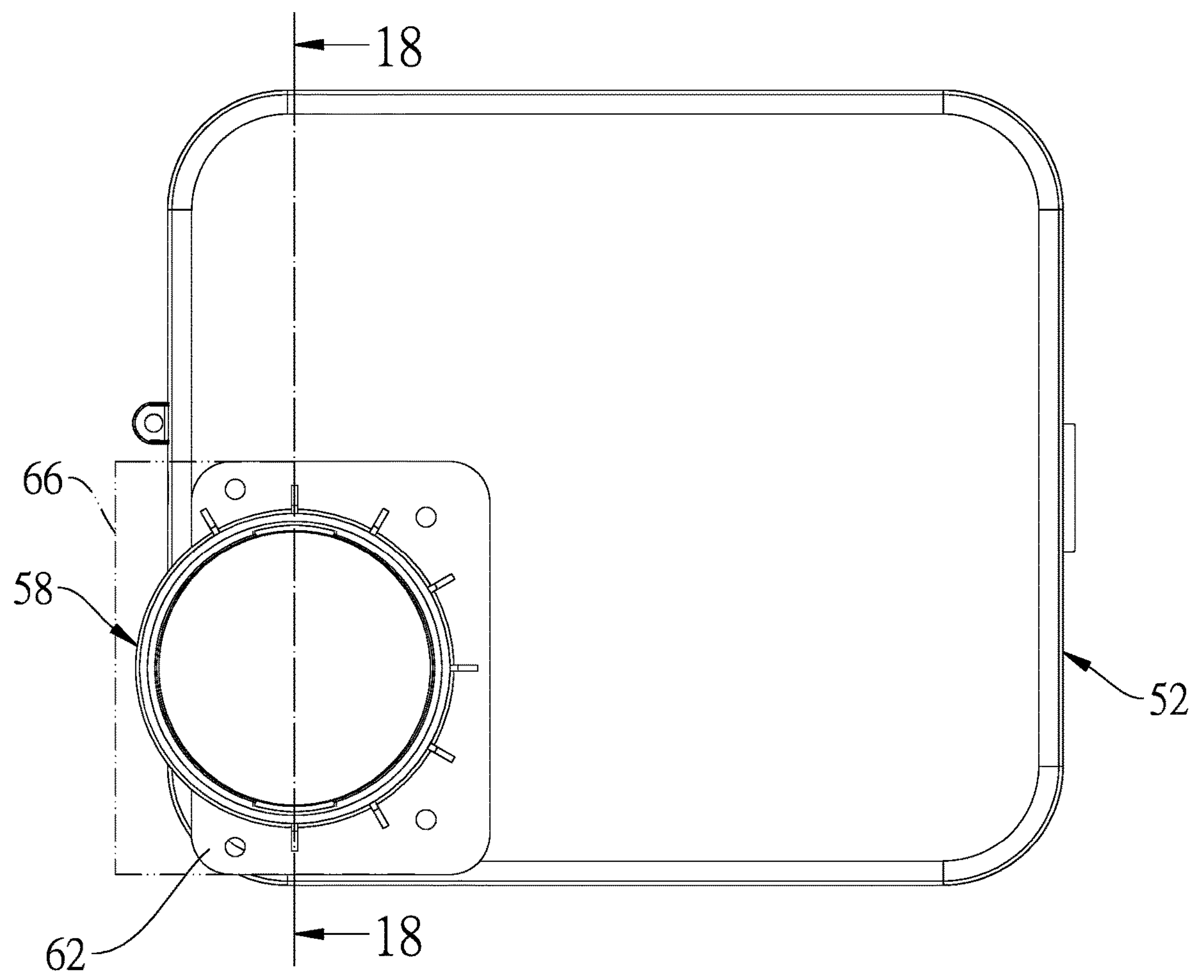
FIG. 19 is a top view of the wireless communication device according to the second embodiment of the present disclosure.
Figure 20:
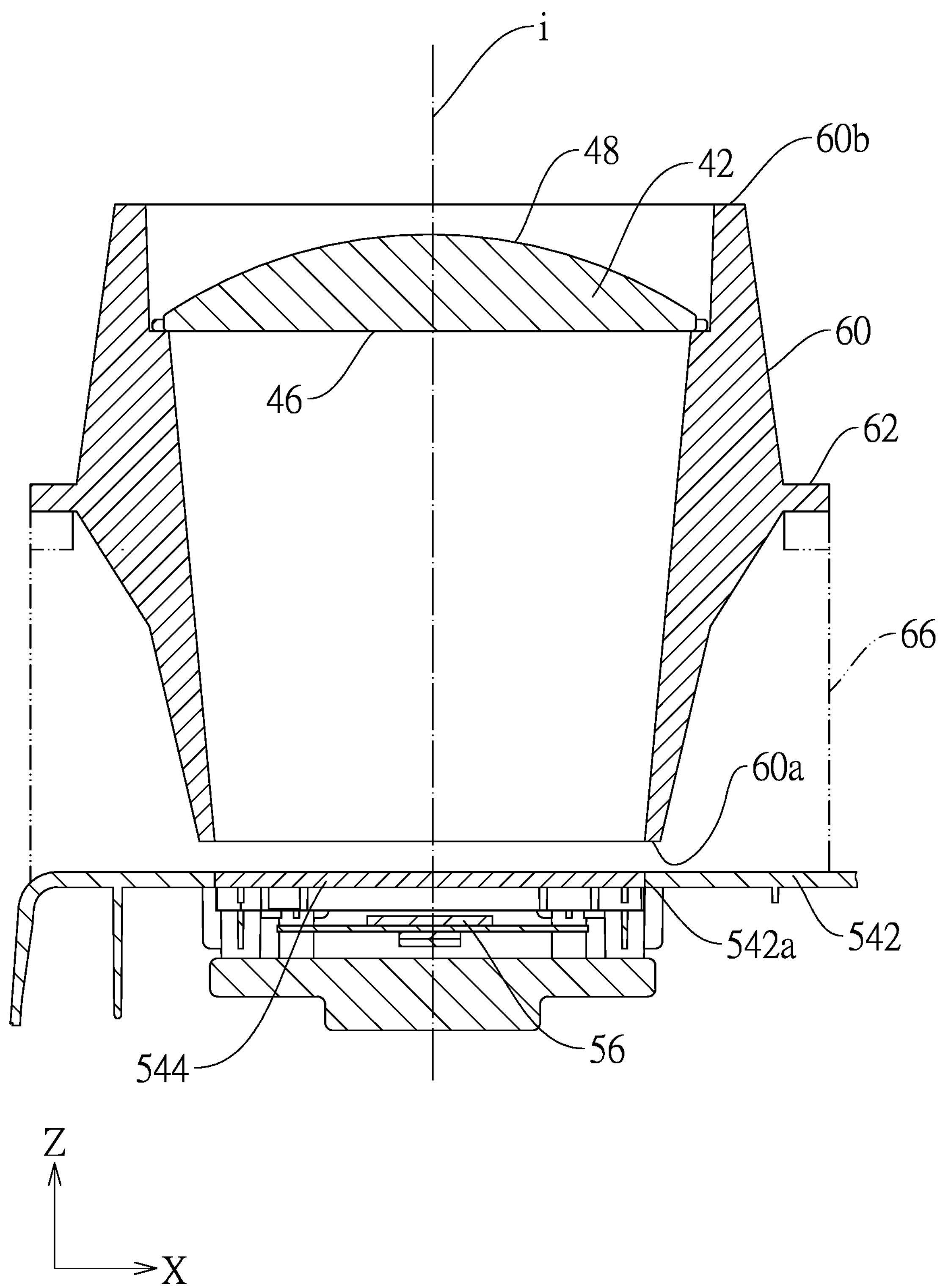
FIG. 20 is a sectional view along the 18-18 line in FIG. 19.

Referring to FIG. 13 and FIG. 16, compare a field pattern with the electromagnetic lens assembly 16 of the current embodiment and a field pattern without the electromagnetic lens assembly 16 In the current embodiment, a peak gain of the electromagnetic lens assembly 16 on the Z-X plane and on the Z-Y plane is about 22.2 dBi; a beamwidth on the Z-X plane is 6.2 degrees; a beamwidth on the Z-Y plane is 29.3 degrees. When the electromagnetic lens assembly 16 is not installed, a peak gain on the Z-X plane and on the Z-Y plane is about 17.9 dBi; a beamwidth on the Z-X plane is 16.9 degrees; a beamwidth on the Z-Y plane is 29.1. In other words, the lens 42 increases the peak gain by 4.3 dB.

In this way, the electromagnetic lens assembly 16 could facilitate directional gain on the wireless signals emitted by the antenna 14. When the electromagnetic lens assembly 16 is removed, the host 10 still has the function of the wireless signal accesses point and could be used alone. In addition, a cover (not shown) could be installed at the opening 122*a* of the casing 12 of the host 10 to prevent moisture, dust, foreign objects, etc. from entering the interior of the casing 12.

In an embodiment, the lens 42 could have at least one notch 442; the tube body 20 could have two first positioning ribs 30 for entering the notch 442 of the lens 42; the protective cover 34 could have two second positioning ribs 40 for entering between the two first positioning ribs 30 to respectively abut against the two first positioning ribs 30.

In an embodiment, the lens 42 could have at least one notch 442, and the tube body 20 could have at least one first positioning rib 30, wherein a width of the notch 442 matches with a width of the first positioning rib 30, allowing the first positioning rib 30 to enter the notch 442 to restrict the lens 42 from rotating.

In an embodiment, a flat lens (not shown) could be disposed on the casing 12 to close the opening 122*a*, wherein the flat lens is made of a material that could be passed through by the electromagnetic wave, for example, a high-frequency microwave plastic (Rexolite1422), teflon, etc., thereby the flat lens constitutes the wireless signal penetrating area.

A wireless communication device 2 according to a second embodiment of the present disclosure is illustrated in FIG. 17 to FIG. 20, which has almost the same structures as the first embodiment, except that a casing 54 of the second embodiment includes a body 542 and a flat lens 544, wherein the body 542 has an opening 542*a*, and the flat lens 544 is disposed on the body 542 and is located at the opening 542*a*; a material of the flat lens 544 and the material of the lens 42 are the same; the flat lens 544 constitutes the wireless signal penetrating area. Additionally, in the current embodiment, a first end 60*a* and a second end 60*b* of a lens barrel 60 of an electromagnetic lens assembly 58 are respectively an open end, and an outer peripheral surface of the lens barrel 60 has an engaging portion 62 that could be detachably fixed to the casing 54 through a support 66, making the first end 60*a* be spaced apart from the flat lens 544 by a space. The lens 42 is located between the first end 60*a* and the second end 60*b*, and the emission surface 48 of the lens 42 faces the second end 60*b*. A body of the lens 42 could selectively be coated with an anti-ultraviolet coating (not shown), wherein the anti-ultraviolet coating could be, for example, Acrylate Resin. The anti-ultraviolet coating could be at least provided on the emission surface 48, or covers a surface of the entire body of the lens 42, preventing the lens 42 from being irradiated by the ultraviolet rays for a long time and deteriorating to affect the convergence of the electromagnetic wave.

An inside of the lens barrel 60 also has a shoulder portion 64 for abutting against the flange portion 44 of the lens 42, wherein the flange portion 44 of the lens 42 could be engaged with the shoulder portion 64 (e.g. through a glue).

In this way, the electromagnetic lens assembly 58 could facilitate directional gain on the wireless signals emitted by the antenna 56. When the electromagnetic lens assembly 58 is removed, the host 52 still has the function of the wireless signal accesses point and could be used alone.

Figure 21:
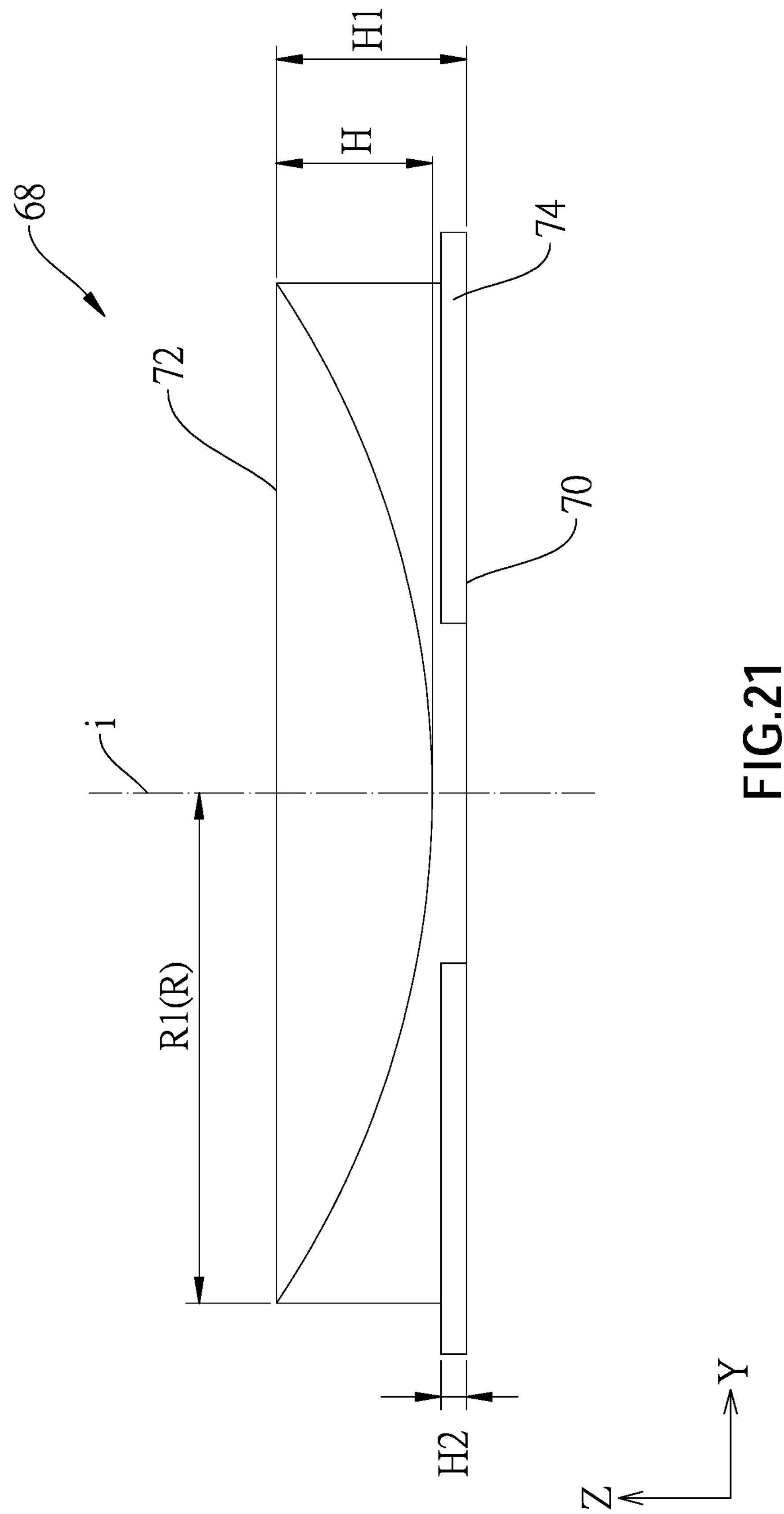
FIG. 21 is a front view of the lens according to a third embodiment of the present disclosure.
Figure 22:
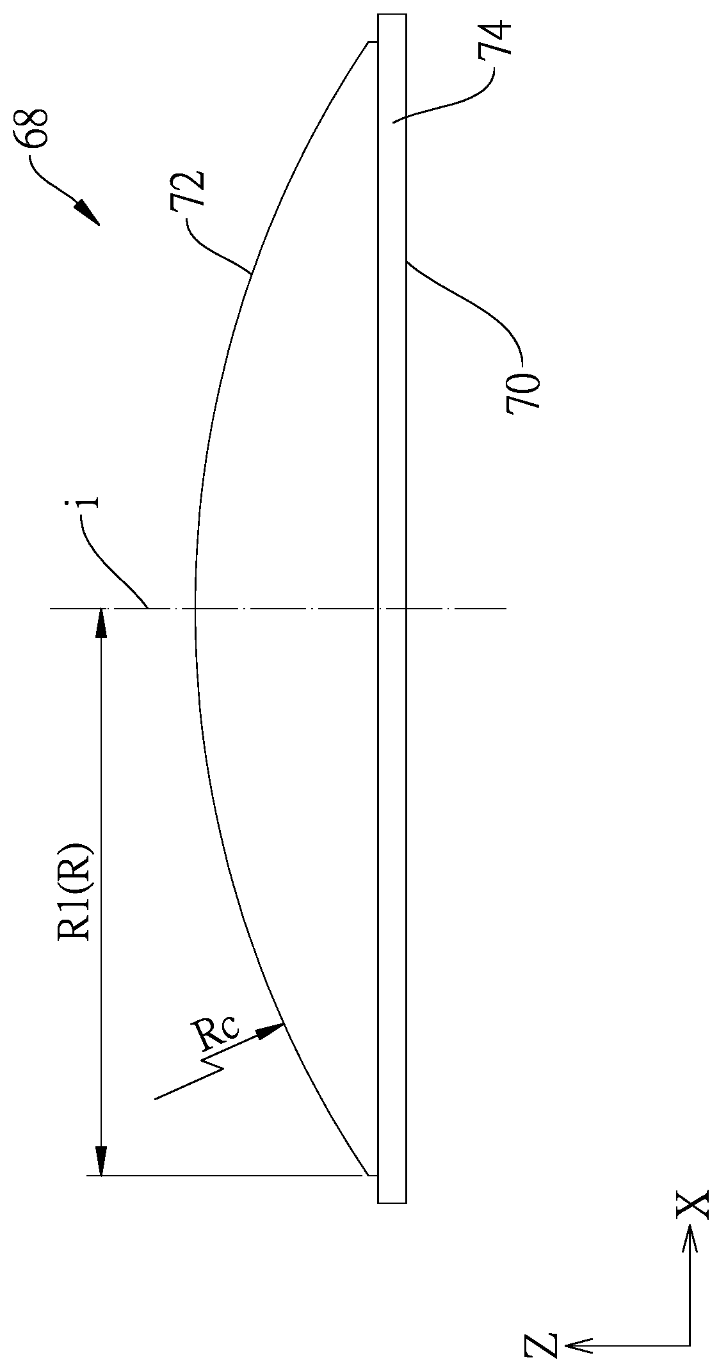
FIG. 22 is a side view of the lens of according to the third embodiment of the present disclosure.
Figure 23:
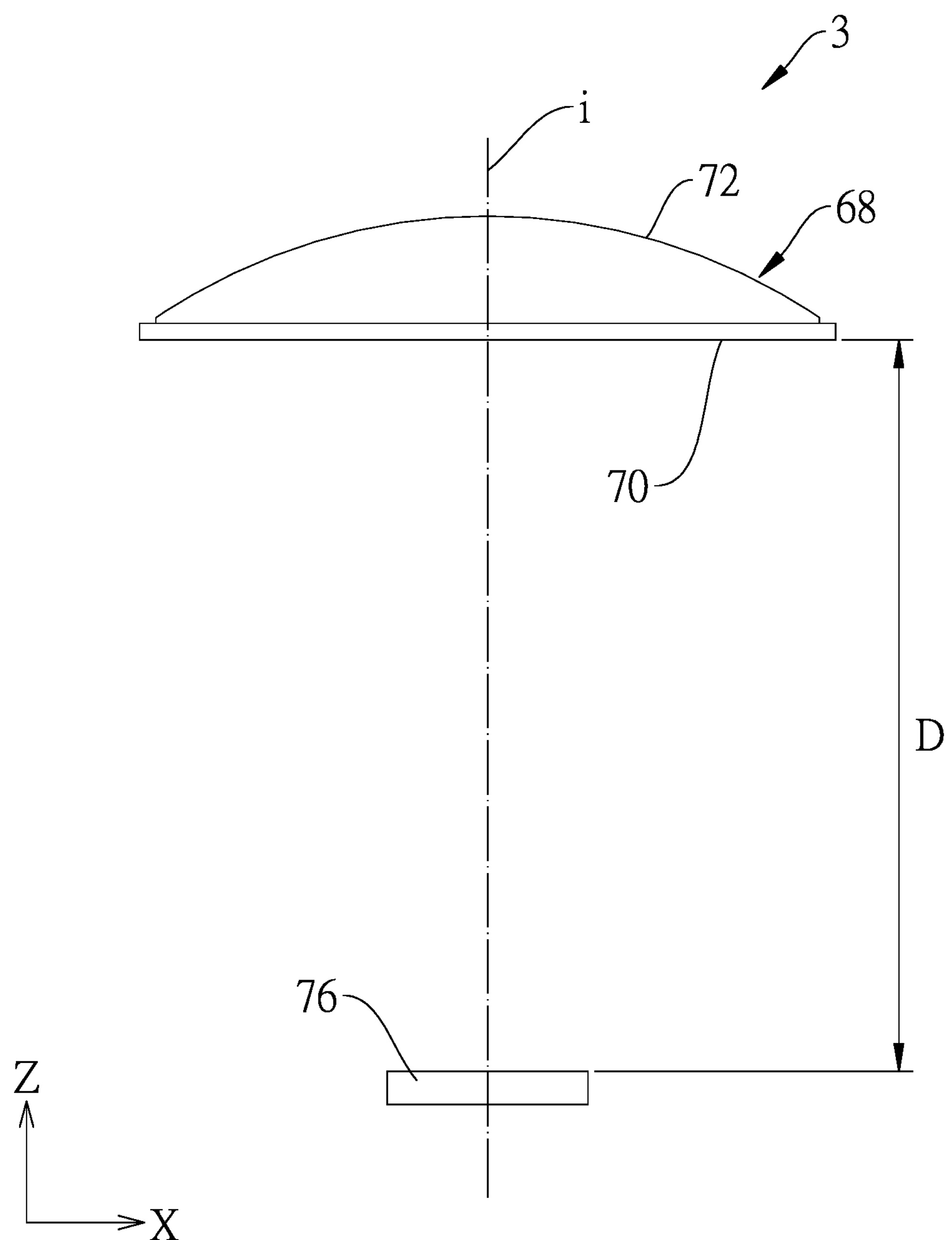
FIG. 23 is a schematic view of the wireless communication device according to the third embodiment of the present disclosure.

A wireless communication device 3 and a lens 68 according to a third embodiment of the present disclosure is illustrated in FIG. 21 to FIG. 23, wherein in the current embodiment, an antenna 76 is a 2×4 array antennas as an example, and the wireless communication device 3 also satisfies $0.50 \leq R/Rc \leq 0.6$ and $0.4 \leq R/D \leq 0.5$.

In the current embodiment, a radius R1 of a cylinder of the lens 68 is 30 mm; a periphery of an emission surface 72 of the lens 68 does not have the round angle, so that a radius R of a projection circle of the emission surface 72 along the axis i is also 30 mm; a curvature radius Rc of the emission surface 72 is 53.6 mm; a height H between a lowest point and a highest point of the emission surface 72 on the axis i is about 9.17 mm, wherein $H=\sqrt{Rc^2-R^2}$; a thickness H1 of the lens 68 on the axis i is 11.17 mm; a thickness H2 of a flange portion 74 of the lens 68 on the axis i is 1.5 mm; a distance D between an incident surface 70 of the lens 68 and the antenna 76 on the axis i is 66.1 mm; R/Rc is about 0.55; R/D is about 0.45.

Since a coverage area of a wave beam of the 2×4 array antennas 76 (or a scanning angle of an array antenna) is smaller, the curvature radius Rc of the emission surface 72 is smaller, the radius R of the projection circle is smaller, and the distance D between the incident surface 70 and the antenna 76 on the axis i is shorter.

In the current embodiment, the lens barrel (not shown) adopts the structure of the lens barrel 18 of the first embodiment and adjusts the size of the lens barrel to correspond to the size of the lens 68. In an embodiment, the lens barrel could also adopt the structure of the lens barrel 60 of the second embodiment.

Figure 24:
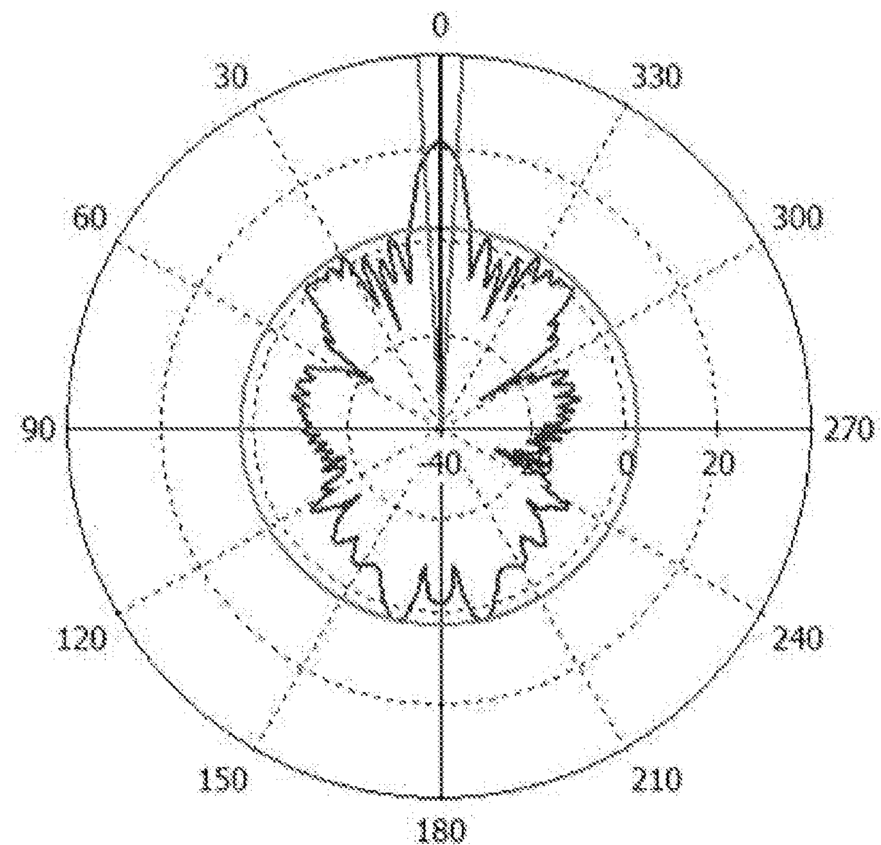
FIG. 24 is a schematic view, showing radiation pattern of the wireless communication device on the Z-X plane according to the third embodiment of the present disclosure.
Figure 25:
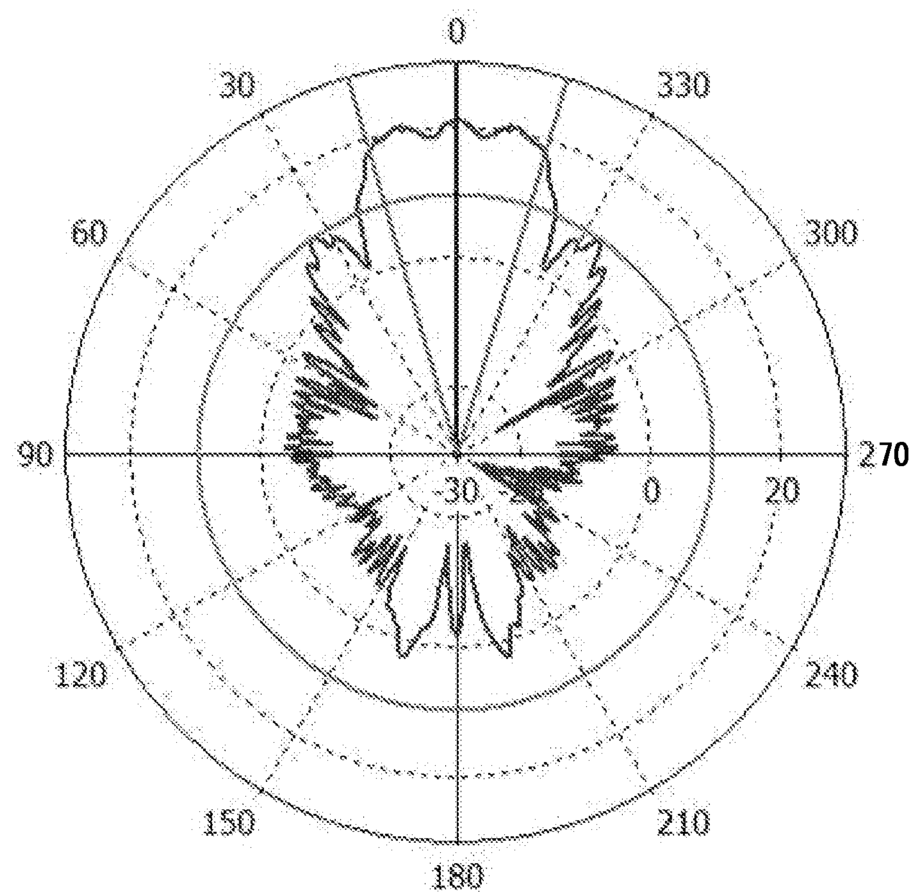
FIG. 25 is a schematic view, showing radiation pattern of the wireless communication device on the Z-Y plane according to the third embodiment of the present disclosure.
Figure 26:
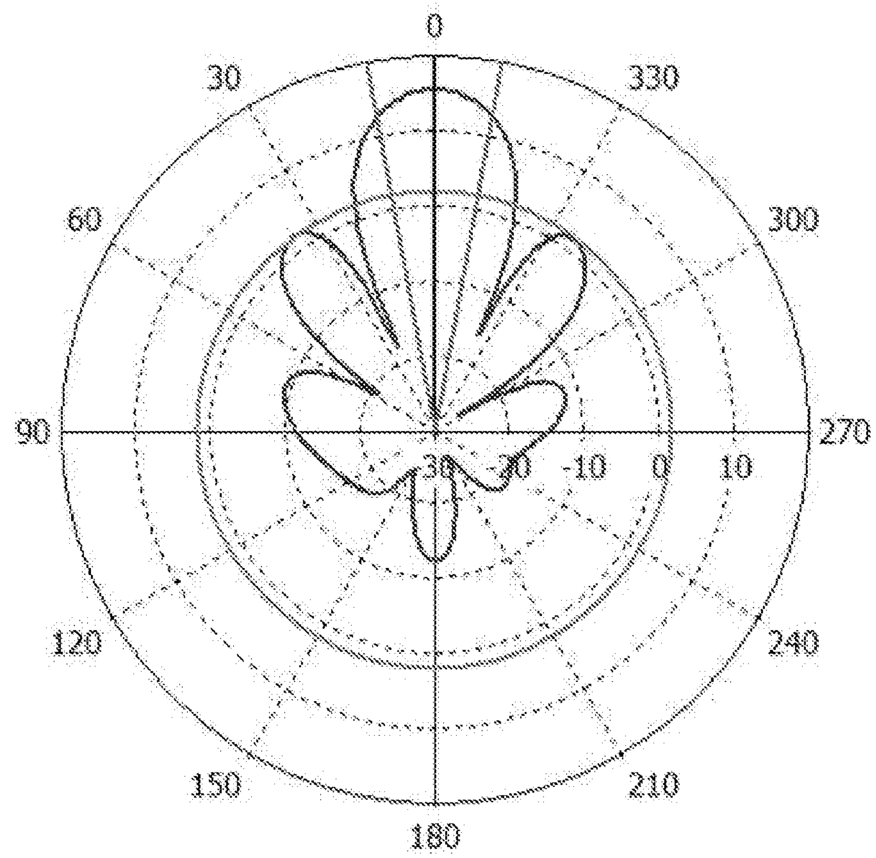
FIG. 26 is a schematic view, showing radiation pattern of the wireless communication device on the Z-X plane without disposing the electromagnetic lens assembly according to the third embodiment of the present disclosure.
Figure 27:
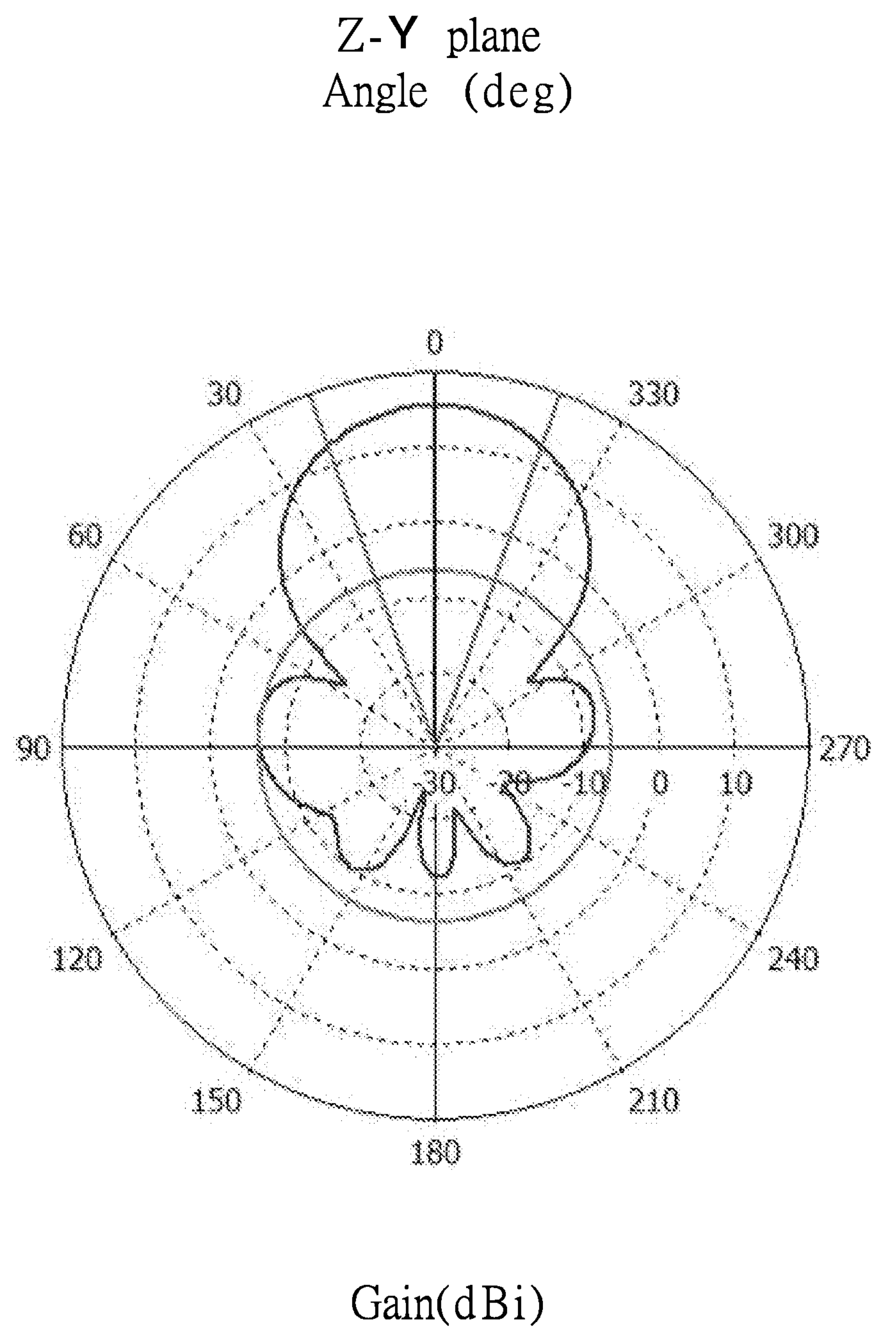
FIG. 27 is a schematic view, showing radiation pattern of the wireless communication device on the Z-Y plane without disposing the electromagnetic lens assembly according to the third embodiment of the present disclosure.

Referring to FIG. 24 and FIG. 27, compare a field pattern with the electromagnetic lens assembly of the current embodiment and field pattern without the electromagnetic lens assembly. In the current embodiment, a peak gain of the electromagnetic lens assembly on the Z-X plane and on the Z-Y plane is about 21.5 dBi; a beamwidth on the Z-X plane is 5.2 degrees; a beamwidth on the Z-Y plane is 32 degrees. When the electromagnetic lens assembly is not installed, a peak gain on the Z-X plane and on the Z-Y plane is about 15.6 dBi; a beamwidth on the Z-X plane is 20.9 degrees; a beamwidth on the Z-Y plane is 44.3 degrees. In other words, the lens 68 increases the peak gain by 5.9 dB.

With the aforementioned design, the electromagnetic lens assembly could facilitate directional gain on the wireless signals emitted by the antenna, without increasing a thickness of the casing of the host. It is worth mentioning that, when the electromagnetic lens assembly is removed, the host could be used alone to transmit wireless signals, thereby effectively bringing down inventory and stocking cost of the casing for manufacturers.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A wireless communication device, comprising:

a casing and an antenna, wherein the casing has a wireless signal penetrating area; the antenna located in the casing corresponds to the wireless signal penetrating area and sends a wireless signal through the wireless signal penetrating area; and an electromagnetic lens assembly comprising a lens barrel and a lens, wherein the lens barrel has a first end and a second end opposite to the first end on an axis of the lens barrel; the first end is closer to the wireless signal penetrating area than the second end; the lens is disposed in the lens barrel for concentrating an electromagnetic wave; the lens has an incident surface and an emission surface on an axis of the lens, wherein the incident surface of the lens is a flat surface and faces the first end, and the emission surface is a convex surface; the emission surface has a curvature, which is not equal to 0, from a perspective of a first axis perpendicular to the axis of the lens, and has a curvature of 0 from a perspective of a second axis perpendicular to the axis of the lens and the first axis;

wherein a radius of a projection circle that the emission surface projects along the axis of the lens is defined as R; a curvature radius of the emission surface on the second axis is defined as Rc; a distance between the incident surface and the antenna on the axis of the lens is defined as D; the lens satisfies $0.50 \leq R/Rc \leq 0.6$ and $0.4 \leq R/D \leq 0.5$.

2. The wireless communication device as claimed in claim 1, wherein an inner wall of the lens barrel has a shoulder portion; the lens is a cylinder and has a flange portion protruding in a radial direction of the lens; the flange portion abuts against the shoulder portion.

3. The wireless communication device as claimed in claim 2, wherein the lens barrel comprises a tube body and a protective cover; the tube body has the first end and the shoulder portion; the shoulder portion abuts against a side of the flange portion on the axis of the lens; the protective cover is engaged with the tube body and has an abutting portion abutting against another side of the flange portion on the axis of the lens.

4. The wireless communication device as claimed in claim 3, wherein the flange portion has at least one notch, and an inner wall of the tube body of the lens barrel has at least one first positioning rib entering the at least one notch to restrict the lens from rotating.

5. The wireless communication device as claimed in claim 4, wherein the at least one first positioning rib includes two first positioning ribs respectively abut against two sides of the at least one notch; the protective cover has two second positioning ribs entering between the two first positioning ribs and respectively abutting against the two first positioning ribs.

6. The wireless communication device as claimed in claim 3, wherein an inner wall of the tube body has a plurality of supporting ribs constituting the shoulder portion; the protective cover has a plurality of abutting ribs constituting the abutting portion.

7. The wireless communication device as claimed in claim 1, wherein the second end of the lens barrel is an open end; the lens is located between the first end and the second end, and the emission surface faces the second end; an anti-ultraviolet coating is at least provided on the emission surface of the lens.

8. The wireless communication device as claimed in claim 1, wherein the casing comprises a body and a flat lens; the body has an opening; the flat lens is disposed on the body and is located at the opening and constitutes the wireless signal penetrating area.

9. An electromagnetic lens assembly, comprising:

a lens barrel having a first end and a second end opposite to the first end on an axial direction of the lens barrel; and a lens disposed in the lens barrel for concentrating an electromagnetic wave, wherein the lens has an incident surface and an emission surface on an axis of the lens; the incident surface is a flat surface facing the first end; the emission surface is a convex surface, and has a curvature, which is not equal to 0, from a perspective of a first axis perpendicular to the axis of the lens, and has a curvature of 0 from a perspective of a second axis perpendicular to the axis of the lens and the first axis;

wherein a radius of a projection circle that the emission surface projects along the axis of the lens is defined as R; a curvature radius of the emission surface on the second axis is defined as Rc; the lens satisfies $0.50 \leq R/Rc \leq 0.6$.

10. The electromagnetic lens assembly as claimed in claim 9, wherein an inner wall of the lens barrel has a shoulder portion; the lens is a cylinder and has a flange portion protruding in a radial direction of the lens; the flange portion abuts against the shoulder portion.

11. The electromagnetic lens assembly as claimed in claim 10, wherein the lens barrel comprises a tube body and a protective cover; the tube body has the first end and the shoulder portion; the shoulder portion abuts against a side of the flange portion on the axis of the lens; the protective cover is engaged with the tube body and has an abutting portion abutting against another side of the flange portion on the axis of the lens.

12. The electromagnetic lens assembly as claimed in claim 11, wherein the flange portion has at least one notch, and an inner wall of the tube body of the lens barrel has at least one first positioning rib entering the at least one notch to restrict the lens from rotating.

13. The electromagnetic lens assembly as claimed in claim 12, wherein the at least one first positioning rib includes two first positioning ribs respectively abut against two sides of the at least one notch; the protective cover has two second positioning ribs entering between the two first positioning ribs and respectively abutting against the two first positioning ribs.

14. The electromagnetic lens assembly as claimed in claim 11, wherein an inner wall of the tube body has a plurality of supporting ribs constituting the shoulder portion; the protective cover has a plurality of abutting ribs constituting the abutting portion.

15. The electromagnetic lens assembly as claimed in claim 9, wherein the second end of the lens barrel is an open end; the lens is located between the first end and the second end, and the emission surface faces the second end; an anti-ultraviolet coating is at least provided on the emission surface of the lens.

* * * * *